United States Patent
Yoshida et al.

(10) Patent No.: US 9,624,372 B2
(45) Date of Patent: Apr. 18, 2017

(54) BELT

(75) Inventors: Takahiko Yoshida, Yamatokohriyama (JP); Shoji Shimizu, Yamatokohriyama (JP); Akihiko Matsumoto, Yamatokohriyama (JP)

(73) Assignee: NITTA CORPORATION, Osaka-Shi (JP)

( * ) Notice: Subject to any disclaimer, the term of this patent is extended or adjusted under 35 U.S.C. 154(b) by 0 days.

(21) Appl. No.: 14/007,818

(22) PCT Filed: Mar. 29, 2012

(86) PCT No.: PCT/JP2012/059281
§ 371 (c)(1),
(2), (4) Date: Sep. 26, 2013

(87) PCT Pub. No.: WO2012/133923
PCT Pub. Date: Oct. 4, 2012

(65) Prior Publication Data
US 2014/0018501 A1     Jan. 16, 2014

(30) Foreign Application Priority Data

Mar. 31, 2011  (JP) ................................. 2011-081232

(51) Int. Cl.
*C08L 75/06* (2006.01)
*C08L 23/08* (2006.01)
(Continued)

(52) U.S. Cl.
CPC .............. *C08L 75/06* (2013.01); *B65G 15/32* (2013.01); *C08L 23/0869* (2013.01);
(Continued)

(58) Field of Classification Search
CPC .......... C08L 75/00; C08L 75/04; C08L 75/06; C08L 23/16; C08L 23/26; C08L 2205/18
(Continued)

(56) References Cited

U.S. PATENT DOCUMENTS 3,882,191 A * 5/1975 Balatoni et al. .............. 525/125
5,149,739 A   9/1992 Lee
(Continued)

FOREIGN PATENT DOCUMENTS

EP    2228325 A1 *  9/2010
JP    62-243631 A   10/1987
(Continued)

OTHER PUBLICATIONS

Jian et al. Toughness Effect of High Temperature Grafting of EPDM with Maleic Anhydride on Nylon 66. China Plastics Industry, vol. 28, Issue 5, pp. 13-17.*

(Continued)

*Primary Examiner* — Mike M Dollinger
(74) *Attorney, Agent, or Firm* — Birch, Stewart, Kolasch & Birch, LLP

(57) ABSTRACT

In the belt according to the present invention, the whole or a part of a belt body is formed from a thermoplastic resin composition (C) comprising a thermoplastic resin (A) and a modified ethylene copolymer (B) dispersed and contained therein. The modified ethylene copolymer (B) is preferably a copolymer, modified with an unsaturated carboxylic acid or a derivative thereof, of ethylene with at least one monomer component selected from (i) olefin components except for ethylene, (ii) diene components and (iii) ester components having an ethylenically unsaturated group. The belt according to the present invention hardly causes abrasion, damage, cracks, breakage and the like on the belt body and is remarkably excellent in durability, even if the belt is used at a high load for a long time.

5 Claims, 6 Drawing Sheets

(51) Int. Cl.

| | | |
|---|---|---|
| *C08L 75/04* | (2006.01) | |
| *C08L 23/26* | (2006.01) | |
| *C08L 75/12* | (2006.01) | |
| *B65G 15/32* | (2006.01) | |
| *F16G 1/14* | (2006.01) | |
| *C08L 67/02* | (2006.01) | |
| *C08L 77/06* | (2006.01) | |
| *C08L 77/12* | (2006.01) | |
| *C08L 23/16* | (2006.01) | |
| *C08G 69/40* | (2006.01) | |
| *C08G 69/44* | (2006.01) | |
| *C08L 77/02* | (2006.01) | |
| *C08L 53/02* | (2006.01) | |

(52) U.S. Cl.
CPC ............... *C08L 23/26* (2013.01); *C08L 67/02* (2013.01); *C08L 67/025* (2013.01); *C08L 75/04* (2013.01); *C08L 75/12* (2013.01); *C08L 77/06* (2013.01); *C08L 77/12* (2013.01); *F16G 1/14* (2013.01); *C08G 69/40* (2013.01); *C08G 69/44* (2013.01); *C08L 23/16* (2013.01); *C08L 53/025* (2013.01); *C08L 77/02* (2013.01); *Y10T 428/1372* (2015.01)

(58) Field of Classification Search
USPC ........................................................ 525/130
See application file for complete search history.

(56) References Cited

U.S. PATENT DOCUMENTS

| | | | | |
|---|---|---|---|---|
| 5,594,062 | A * | 1/1997 | Takemura ................ | C08F 8/30 524/504 |
| 5,693,714 | A * | 12/1997 | Bauman et al. ............. | 525/104 |
| 6,207,723 | B1 * | 3/2001 | Matsushita et al. ............ | 521/41 |
| 6,231,965 | B1 * | 5/2001 | Takemura ............. | C08F 255/02 428/327 |
| 2009/0242094 | A1 * | 10/2009 | Kato et al. .................... | 152/565 |
| 2009/0275690 | A1 * | 11/2009 | Weaver ................. | C08G 18/69 524/507 |
| 2010/0036028 | A1 * | 2/2010 | Morooka ..................... | 524/168 |
| 2010/0260991 | A1 * | 10/2010 | Subramanian .......... | B32B 27/32 428/213 |
| 2012/0053020 | A1 * | 3/2012 | Wright .......................... | 482/54 |
| 2014/0017429 | A1 * | 1/2014 | Kasazaki et al. ............ | 428/36.4 |

FOREIGN PATENT DOCUMENTS

| | | |
|---|---|---|
| JP | 5-287140 A | 11/1993 |
| JP | 05-287141 A | 11/1993 |
| JP | 09-087477 A | 3/1997 |
| JP | 10-103411 A | 4/1998 |
| JP | H11-100512 A | 4/1999 |
| JP | 2001-247760 A | 9/2001 |
| JP | 2004-107440 A | 4/2004 |
| JP | 2008-260887 A | 10/2008 |
| JP | 2008-266354 A | 11/2008 |
| JP | 2009-197896 A | 9/2009 |
| JP | 2011-121689 A | 6/2011 |

OTHER PUBLICATIONS

International Search Report, issued in PCT/JP2012/059281, dated, May 29, 2012.
Database WPI, Week 198748, Thomson Scientific, London, GB; AN 1987-338568, Oct. 24, 1987, XP-002731877.
Database WPI, Week 199348, Thomson Scientific, London, GB; AN 1993-383200, Nov. 2, 1993, XP-002731878.
Database WPI, Week 199723, Thomson Scientific, London, GB; AN 1997-255701, Mar. 31, 1997, XP-002731876.
Database WPI, Week 200437, Thomson Scientific, London, GB; AN 2004-394301, Apr. 8, 2004, XP-002731875.
Extended European Search Report dated Nov. 14, 2014 for Application No. 12764382.3.
Chinese Office Action dated Jan. 29, 2015 for Application No. 201280015472.3 with English language translation.
Zhang, Jun et al., "Study on PA66/EVA Copolymer Grafted Maleic Anhydride Blends", China Plastics, vol. 17, No. 2, Feb. 2003, pp. 33-38.
Golf Ball Hardness Comparison Guide, Japan Patent Office, Ministry of Economy, Trade and Industry, p. 147, accessed Oct. 8, 2015 with English language translation.
Japanese Notice of Reasons for Rejections Dated Sep. 1, 2015 for Application No. 2013-507849 with English language translation.
Taiwanese Office Action for Application No. 101111314, dated Sep. 22, 2015, with English language translation.

* cited by examiner

BELT

TECHNICAL FIELD

The present invention relates to a belt (excluding toothed belts) utilized for power transmission, conveyance and the like, particularly to a belt in which the whole or a part of a belt body is formed from a specific thermoplastic resin composition.

BACKGROUND ART

Conveyance belts and transmission belts require bending fatigue resistance, abrasion resistance, heat resistance, durability and the like, for example, as flat belts, V-belts and the like. Belts are usually imparted with a tension and used in an elongated state. Belts are used in combination with resin-made or metal-made pulleys rotating at a high speed, and are contacted with pulleys, and caused to be wound therearound and to be rubbed together, and are exposed to collision with and rubbing on conveyed materials, and the like.

Japanese Patent Laid-Open Nos. 2009-197896 and 2011-121689 disclose conveyance flat belts whose belt body is formed from a thermoplastic elastomer such as a thermoplastic polyurethane elastomer.

However, if conventional flat belts and V-belts having a belt body thereof formed from a thermoplastic elastomer such as a thermoplastic polyurethane elastomer are used as high-load power transmission belts, the belt body abrades and cracks in an early stage, and provides the belts with insufficient durability in some cases.

CITATION LIST

Patent Literature

Patent Literature 1: Japanese Patent Laid-Open No. 2009-197896
Patent Literature 2: Japanese Patent Laid-Open No. 2011-121689

SUMMARY OF INVENTION

Technical Problem

Therefore, it is an object of the present invention to provide a belt (excluding toothed belts) which does not cause abrasion, damage, cracks, breakage, and the like on the belt body in an early stage, and is thus remarkably excellent in durability even if being used at a high load for power transmission and the like.

Solution to Problem

As a result of exhaustive studies to achieve the above-mentioned object, the present inventors have found that if a belt body of a belt, such as a flat belt or a V-belt, is formed by using a thermoplastic resin composition comprising a thermoplastic resin and a modified ethylene copolymer, and obtained by dispersing the modified ethylene copolymer into the thermoplastic resin, the belt remarkably improved in abrasion resistance and bending fatigue resistance and remarkably excellent in durability can be obtained; and this finding has led to the completion of the present invention.

That is, the present invention provides a belt (excluding toothed belts), wherein the whole or a part of a belt body is formed from a thermoplastic resin composition (C) comprising a thermoplastic resin (A) and a modified ethylene copolymer (B), and obtained by dispersing the modified ethylene copolymer (B) into the thermoplastic resin (A).

The modified ethylene copolymer (B) is preferably a copolymer, modified with an unsaturated carboxylic acid or a derivative thereof, of ethylene with at least one monomer component selected from the group consisting of (i) olefin components except for ethylene, (ii) diene components and (iii) ester components having an ethylenically unsaturated group.

The thermoplastic resin (A) is preferably at least one selected from polyamide resins, polyester resins, polycarbonate-based resins and polyacetal resins.

The thermoplastic resin (A) is preferably a thermoplastic elastomer (TPE) (A1) as well. The thermoplastic elastomer (A1) is preferably at least one selected from the group consisting of polyurethane-based thermoplastic elastomers (A11), polyester-based thermoplastic elastomers (A12) and polyamide-based thermoplastic elastomers (A13).

The modified ethylene copolymer (B) is preferably an ethylene-propylene-diene copolymerized rubber modified with an unsaturated carboxylic acid or a derivative thereof.

The weight proportion [(B)/(A)] of the modified ethylene copolymer (B) to the thermoplastic resin (A) is, for example, in the range of 0.1/99.9 to 60/40.

The thermoplastic resin composition (C) preferably has a hardness (JIS K6253, durometer type A) of not less than 60.

In the present description, the hardness is a value measured according to JIS K6253 (durometer type A). However, in Examples, there were cases where measurement was carried out using durometer type D (which will be described to the effect).

Advantageous Effects of Invention

The belt according to the present invention, since a belt body is formed from a specific thermoplastic resin composition, is excellent not only in abrasion resistance but also in bending fatigue resistance, and hardly causes abrasion, damage, cracks, breakage and the like on the belt body in an early stage and is remarkably excellent in durability, even if the belt is used at a high load for a long time.

DESCRIPTION OF EMBODIMENTS

Figure 1:
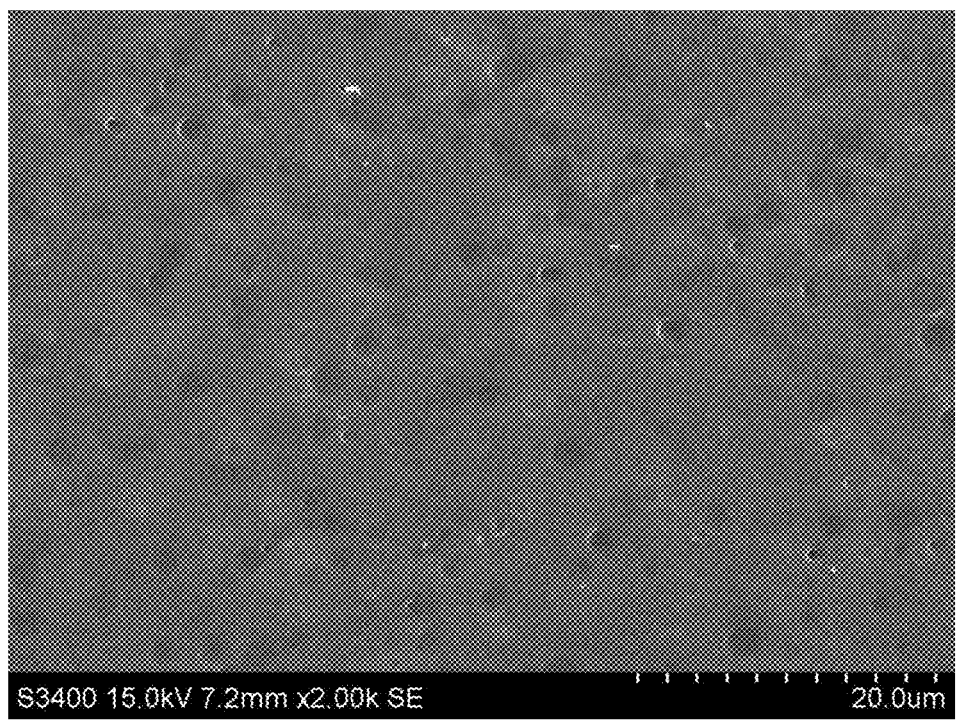
FIG. 1 is a SEM photograph of a pellet cross-section of a thermoplastic elastomer alloy (an alloy of an EPDM and an etheric TPU) obtained in Comparative Example 4.

The whole or a part of a belt body of the belt according to the present invention is formed from a thermoplastic resin composition (C) comprising a thermoplastic resin (A) and a modified ethylene copolymer (B), and the thermoplastic resin composition (C) is obtained by dispersing the modified ethylene copolymer (B) into the thermoplastic resin (A). Here, the belt according to the present invention does not include toothed belts.

In the present invention, the belt is not especially limited as long as being a belt excluding toothed belts, and examples thereof include known belts such as flat belts, V-belts and V-ribbed belts. A belt is usually constituted of a belt body and core wires (tension members) embedded in the interior of the belt body. A belt may spare core wires. A belt may have, as required, other members and components, coating layers and the like. A belt may be of a single layer or may be of a two or more-layer laminate.

[Thermoplastic Resin (A)]

In the present invention, as a thermoplastic resin (A), a known thermoplastic resin can be used. The thermoplastic resin (A) can be used singly or in combinations of two or more. The thermoplastic resin (A) does not include a substance (compound) corresponding to a modified ethylene copolymer (B).

Examples of the thermoplastic resin (A) include polyurethane-based resins, polyester-based resins, polyamide-based resins, polyimide-based resins, polystyrenic resins, polycarbonate-based resins, polyolefinic resins, acrylic resins, methacrylic resins, fluororesins, silicone-based resins, polyacetal resins (polyoxymethylene), polyarylate resins, polyphenylene ethers, polyphenylene sulfides, polysulfones, polyethersulfones, polyetheretherketones, vinyl chloride resins and polyvinylic resins, but are not limited thereto as long as they are capable of dispersing a modified ethylene copolymer (B) (dispersing and containing a modified ethylene copolymer (B)). The thermoplastic resin (A) may be used singly or plurally, or may use a multicomponent singly or plurally such as copolymers, additions, blends and alloys. The thermoplastic resin (A) has a weight-average molecular weight of, for example, 5,000 to 1,000,000, and preferably 10,000 to 500,000.

More specific examples of the thermoplastic resin (A) include, for example, polyamide-based resins such as polyamide 11, polyamide 12, polyamide 6, polyamide 66, polyamide 610, polyamide 612, polyamide 666, polyamide 46, polyamide 10T, polyamide 6T and aramid resins (whole aromatic polyamide); polyester-based resins such as polyethylene terephthalate, polybutylene terephthalate and polyethylene naphthalate; polyimide; polystyrene; polycarbonate; polyolefinic resins such as polyethylenes and polypropylenes; fluororesins such as polyvinylidene fluorides, polytetrafluoroethylenes, polyvinyl fluorides, polychlorotrifluoroethylenes, perfluoroalkoxyfluororesins, ethylene tetrafluoride-propylene hexafluoride copolymers, ethylene-ethylene tetrafluoride copolymers and ethylene-chlorotrifluoroethylene copolymers; polyacetal resins; polyethersulfones; polyetheretherketones; and polyvinylic resins such as polyvinyl alcohols and ethylene vinyl alcohols. Additives such as reinforcing fillers such as glass fibers may be incorporated in these thermoplastic resins (A). Also amorphous materials (thermoplastic resins) having no distinct melting point, in the case of being molded by a thermoplastic resin molding machine, can be incorporated. The thermoplastic resin (A) may be resins obtained from fossil raw materials and natural resins as well.

Among the above, the thermoplastic resin (A) is preferably at least one selected from the group consisting of polyamide-based resins, polyester-based resins, polycarbonate-based resins and polyacetal resins.

[Thermoplastic Elastomer (A1)]

As the thermoplastic resin (A), a thermoplastic elastomer (TPE) (A1) may be preferably used. The thermoplastic elastomer (A1) comprises a hard phase (hard segment) and a soft phase (soft segment), and though exhibiting properties as a rubber at normal temperature, is a polymer exhibiting thermoplasticity at high temperatures. Use of the thermoplastic elastomer (A1) can improve the abrasion resistance, mechanical strength and molding processability of a thermoplastic resin composition.

The thermoplastic elastomer (A1) may be used singly or as a mixture of two or more. As the thermoplastic resin (A), a thermoplastic elastomer (A1) and a resin other than a thermoplastic elastomer may be concurrently used.

Examples of the thermoplastic elastomer (A1) include polyurethane-based thermoplastic elastomers (A11), polyester-based thermoplastic elastomers (A12), polyamide-based thermoplastic elastomers (A13), polystyrenic thermoplastic elastomers (A14), fluoropolymer-based thermoplastic elastomers (A15), polyvinyl chloride-based thermoplastic elastomers (A16), polyolefinic thermoplastic elastomers (A17) and polyimide-based elastomers (A18), but are not limited thereto. The thermoplastic elastomer (A1) may also be a thermoplastic elastomer in which a resin, an elastomer and/or an oligomer component are blended (mixed). The thermoplastic elastomer (A1) may be used singly or in combinations of two or more. Among the above thermoplastic elastomers (A1), preferable are polyurethane-based thermoplastic elastomer (A11), polyester-based thermoplastic elastomers (A12) and polyamide-based thermoplastic elastomers (A13), and especially preferable are polyurethane-based thermoplastic elastomers (A11).

[Polyurethane-Based Thermoplastic Elastomer (A11)]

As the polyurethane-based thermoplastic elastomer (A11), known thermoplastic polyurethanes (TPU) can be used. The thermoplastic polyurethane can be used singly or in combinations of two or more. The thermoplastic polyurethane is usually obtained by reacting a polyisocyanate, a long-chain polyol and a chain extender, and as required, other isocyanate-reactive compounds.

The polyisocyanate is not especially limited as long as it is a compound having at least two isocyanate groups in the molecule. The polyisocyanate includes, for example, aliphatic polyisocyanates, alicyclic polyisocyanates, aromatic polyisocyanates and aralphatic (aromatic-aliphatic) polyisocyanates. The polyisocyanate can be used singly or in combinations of two or more.

Examples of the aliphatic polyisocyanate include aliphatic diisocyanates such as 1,3-trimethylene diisocyanate, 1,4-tetramethylene diisocyanate, 1,5-pentamethylene diisocyanate, 1,6-hexamethylene diisocyanate, 1,2-propylene diisocyanate, 1,2-butylene diisocyanate, 2,3-butylene diisocyanate, 1,3-butylene diisocyanate, 2-methyl-1,5-pentamethylene diisocyanate, 3-methyl-1,5-pentamethylene diisocyanate, 2,4,4-trimethyl-1,6-hexamethylene diisocyanate and 2,2,4-trimethyl-1,6-hexamethylene diisocyanate.

Examples of the alicyclic polyisocyanate include alicyclic diisocyanates such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate (isophorone diisocyanate), 4,4'-methylenebis(cyclohexyl isocyanate), methyl-2,4-cyclohexane diisocyanate, methyl-2,6-cyclohexane diisocyanate, 1,3-bis(isocyanatomethyl)cyclohexane, 1,4-bis(isocyanatomethyl)cyclohexane and norbornane diisocyanate.

Examples of the aromatic polyisocyanate include aromatic diisocyanates such as m-phenylene diisocyanate, p-phenylene diisocyanate, 2,4-tolylene diisocyanate, 2,6-tolylene diisocyanate, naphthylene 1,4-diisocyanate, naphthylene 1,5-diisocyanate, 4,4'-diphenyl diisocyanate (4,4'-biphenyl diisocyanate), 4,4'-diphenylmethane diisocyanate, 2,4'-diphenylmethane diisocyanate, 2,2'-diphenylmethane diisocyanate, 4,4'-diphenyl ether diisocyanate, 2,2'-diphenylpropane-4,4'-diisocyanate, 3,3'-dimethyldiphenylmethane-4,4'-diisocyanate and 4,4'-diphenylpropane diisocyanate.

Examples of the araliphatic polyisocyanate include araliphatic diisocyanates such as 1,3-xylylene diisocyanate, 1,4-xylylene diisocyanate, ω,ω'-diisocyanato-1,4-diethylbenzene, 1,3-bis(1-isocyanato-1-methylethyl)benzene, 1,4-bis(1-isocyanato-1-methylethyl)benzene and 1,3-bis(α,α-dimethylisocyanatomethyl)benzene.

As the polyisocyanate, suitably usable are 1,6-hexamethylene diisocyanate, 4,4'-methylenebis(cyclohexyl isocyanate), 1,3-bis(isocyanatomethyl)cyclohexane, 1,4-bis(isocyanatomethyl)cyclohexane, isophorone diisocyanate, 2,4-tolylene diisocyanate, 2,6-tolylene diisocyanate, 4,4'-diphenylmethane diisocyanate, 1,3-xylylene diisocyanate, 1,4-xylylene diisocyanate, norbornane diisocyanate and 1,3-bis(α,α-dimethylisocyanatomethyl)benzene.

As the polyisocyanate, also usable are dimers, trimers, reaction products or polymers of the above exemplified aliphatic polyisocyanates, alicyclic polyisocyanates, aromatic polyisocyanates and araliphatic polyisocyanates (for example, a dimmer or a trimer of diphenylmethane diisocyanate, reaction products of trimethylolpropane and tolylene diisocyanate, reaction products of trimethylolpropane and hexamethylene diisocyanate, polymethylene polyphenyl isocyanates, polyether polyisocyanates, polyester polyisocyanates and the like) and the like.

Examples of the long-chain polyol include polyether polyols, polyester polyols, polycarbonate polyols, polyolefin polyols and polyacryl polyols. The long-chain polyol has a number-average molecular weight of usually not less than 500, preferably 500 to 10,000, still more preferably 600 to 6,000, and further still more preferably 800 to 4,000. The long-chain polyol can be used singly or in combinations of two or more.

Examples of the polyether polyol include polyalkylene ether glycols such as polyethylene ether glycols, polypropylene ether glycols and polytetramethylene ether glycols (PTMG), and additionally copolymers containing a plurality of alkylene oxides (alkylene oxide-another alkylene oxide) as monomer components, such as ethylene oxide-propylene oxide copolymers. Among the polyether polyols, especially preferable are polytetramethylene ether glycols (PTMG).

As the polyester polyol, usable are, for example, polycondensates of a polyhydric alcohol and a polyvalent carboxylic acid, ring-opened polymers of cyclic esters (lactones), and reaction products of three components of a polyhydric alcohol, a polyvalent carboxylic acid and a cyclic ester (lactone). In the polycondensates of a polyhydric alcohol and a polyvalent carboxylic acid, as the polyhydric alcohol, usable are, for example, ethylene glycol, diethylene glycol, propylene glycol, dipropylene glycol, 1,3-propanediol, 1,3-butanediol, 1,4-butanediol, 2-methyl-1,3-propanediol, 1,5-pentanediol, neopentyl glycol, 1,6-hexanediol, 3-methyl-1,5-pentanediol, 2,4-diethyl-1,5-pentanediol, 1,9-nonanediol, 1,10-decanediol, glycerol, trimethylolpropane, trimethylolethane, cyclohexanediols (1,4-cyclohexanediol and the like), cyclohexanedimethanols (1,4-cyclohexanedimethanol and the like), bisphenols (bisphenol A and the like), and sugar alcohols (xylitol, sorbitol and the like). On the other hand, examples of the polyvalent carboxylic acid include aliphatic dicarboxylic acids such as malonic acid, maleic acid, succinic acid, glutaric acid, adipic acid, suberic acid, azelaic acid, sebacic acid and dodecanedioic acid; alicyclic dicarboxylic acids such as 1,4-cyclohexanedicarboxylic acid; and aromatic dicarboxylic acids such as terephthalic acid, isophthalic acid, ortho-phthalic acid, 2,6-naphthalenedicarboxylic acid, para-phenylenedicarboxylic acid and trimellitic acid. In the ring-opened polymers of cyclic esters, examples of the cyclic ester include propiolactone, β-methyl-δ-valerolactone and ε-caprolactone. In the reaction products of three components, the above exemplified polyhydric alcohols, polyvalent carboxylic acids and cyclic esters and the like can be used. Among the polyester polyols, preferable are adipate-based polyester polyols [for example, C2-6 alkylene adipates such as poly(ethylene adipate), poly(diethylene adipate), poly(propylene adipate), poly(tetramethylene adipate), poly(hexamethylene adipate) and poly(neopentylene adipate)] which are polycondensates of adipic acid and a polyhydric alcohol (for example, one or two or more of alkane diols having 2 to 6 carbon atoms such as ethylene glycol, 1,4-butanediol, neopentyl glycol and 1,6-hexanediol), caprolactone polyols obtained by ring-opening polymerization of ε-caprolactone, polyester polyols obtained by ring-opening polymerization of β-methyl-δ-valerolactone using a polyhydric alcohol such as ethylene glycol, and the like.

Examples of the polycarbonate polyol include reaction products of a polyhydric alcohol and phosgene, a chloroformate ester, a dialkyl carbonate or a diaryl carbonate (a polyhydric alcohol and a compound selected from the group consisting of phosgene, a chloroformate ester, a dialkyl carbonate and a diaryl carbonate); and ring-opened polymers of cyclic carbonate esters (alkylene carbonates and the like). In the reaction products of a polyhydric alcohol and phosgene, as the polyhydric alcohol, specifically usable are the above exemplified polyhydric alcohols (for example, ethylene glycol, propylene glycol, 1,3-butanediol, 1,4-butanediol, neopentyl glycol, 1,5-pentanediol, 1,6-hexanediol and 1,9-nonanediol). In the ring-opened polymers of cyclic carbonate esters, examples of the alkylene carbonate include ethylene carbonate, trimethylene carbonate, tetramethylene carbonate and hexamethylene carbonate. Here, the polycarbonate polyol suffices if being a compound having carbonate bonds in the molecule and having hydroxyl groups at the terminals, and may have ester bonds together with the carbonate bonds. Typical examples of the polycarbonate polyol include poly(hexamethylene carbonate) diols, diols obtained by ring-opening addition polymerization of a lactone to a poly(hexamethylene carbonate) diol, and cocondensates of a poly(hexamethylene carbonate) diol and a polyester diol or a polyether diol.

The polyolefin polyol is a polyol having an olefin as a component of a skeleton (or a main chain) of a polymer or a copolymer, and having at least two hydroxyl groups in the molecule (particularly at the terminals). The above olefin may be an olefin (for example, an α-olefin such as ethylene or propylene) having a carbon-carbon double bond at the terminal, may be an olefin (for example, isobutene) having a carbon-carbon double bond at a site other than the terminals, or further may be a diene (for example, butadiene or isoprene). Typical examples of the polyolefin polyol include substances (compounds) obtained by modifying, with hydroxyl groups, the terminals of butadiene- or isoprene-based polymers such as butadiene homopolymers, isoprene homopolymers, butadiene-styrene copolymers, butadiene-isoprene copolymers, butadiene-acrylonitrile copolymers, butadiene-2-ethylhexyl acrylate copolymers, butadiene-n-octadecyl acrylate copolymers.

The polyacryl polyol is a polyol having a (meth)acrylate as a component of a skeleton (or a main chain) of a polymer or a copolymer, and having at least two hydroxyl groups in the molecule (particularly at the terminals). As the (meth) acrylate, suitably used are alkyl(meth)acrylate esters [for example, $C_{1-20}$ alkyl(meth)acrylate esters]. As the polyol, every material other than materials cited here can be used.

As the chain extender, usable are chain extenders usually used in production of thermoplastic polyurethanes, and the type thereof is not especially limited, and low-molecular weight polyols and polyamines and the like can be used. The chain extender has a molecular weight of usually less than 500, and preferably not more than 300. The chain extender can be used singly or in combinations of two or more.

Typical examples of the chain extender include polyols (particularly, diols) such as ethylene glycol, diethylene glycol, propylene glycol, 1,3-propanediol, 1,3-butanediol, 1,4-butanediol, 1,5-pentanediol, 1,2-pentanediol, 2,3-pentanediol, neopentyl glycol, 1,6-hexanediol, 3-methyl-1,5-pentanediol, 1,4-cyclohexanediol and 1,4-cyclohexanedimethanol, and polyamines (particularly, diamines) such as hexamethylenediamine, 3,3'-dimethyl-4,4'-diaminodicyclohexylmethane and 4,4'-methylenebis-2-chloroaniline. Among these, diols are especially preferable.

As the thermoplastic polyurethane, preferable are thermoplastic polyurethanes obtained by reacting a polyisocyanate, a long-chain polyol and a chain extender in the range of the ratio (NCO/isocyanate-reactive groups), of the molar number of isocyanate groups of the polyisocyanate and the molar number of isocyanate-reactive groups (hydroxyl group, amino group and the like) of the long-chain polyol and the chain extender, of 0.9 to 1.3, especially 0.95 to 1.1. The proportion of the long-chain polyol to the chain extender, [the former/the latter (molar ratio)], can suitably be selected in the range of, for example, 0.1 to 1.0, and preferably 0.2 to 2, according to physical properties and the like of the thermoplastic polyurethane. In the above reaction, in order to promote the reaction, as required, a catalyst such as a tertiary amine, an organometal compound or a tin compound may be used.

The thermoplastic polyurethane usually has a weight-average molecular weight Mw of 5,000 to 1,000,000. The thermoplastic polyurethane has thermoplasticity, though some exhibit no distinct melting point. The thermoplastic polyurethane has thermoplasticity, and can be molded by a common thermoplastic resin molding machine such as extrusion, injection molding, heat press or the like.

The hardness of the thermoplastic polyurethane, but not limited to, from the viewpoint of raising mechanical properties of the thermoplastic resin composition (thermoplastic elastomer alloy and the like) according to the present invention, is preferably not less than 60 (for example, 60 to 96), more preferably not less than 78 (for example, 78 to 96), still more preferably not less than 89 (for example, 89 to 95), and especially preferably not less than 91 (for example, 91 to 94), in hardness of JIS K6253 (durometer type A). From the viewpoint of letting the thermoplastic resin composition (thermoplastic elastomer alloy and the like) have reasonable flexibility and raising the bending fatigue resistance, the thermoplastic polyurethane has a hardness in the range of, for example, 60 to 93, and especially preferably 78 to 91 (particularly 78 to 88).

The thermoplastic polyurethane preferably uses a polyester polyol or a polyether polyol as the long-chain polyol. Among these, the thermoplastic polyurethane is especially preferably adipate-based TPUs using an adipate-based polyester polyol as the long-chain polyol, caprolactone-based TPUs using a caprolactone polyol as the long-chain polyol, and PTMG-based TPUs using a polytetramethylene ether glycol (PTMG) as the long-chain polyol.

As the thermoplastic polyurethane, commercially available products can be used. Examples of the commercially available products include an adipate-based TPU of 80 in hardness (an adipate-based TPU with a hardness of 80, a hardness of 80), an adipate-based TPU of 90 in hardness, a caprolactone-based TPU of 90 in hardness, a PTMG-based TPU of 92 in hardness, and an adipate-based TPU of 92 in hardness.

[Polyester-Based Thermoplastic Elastomer (A12)]

As the polyester-based thermoplastic elastomer (A12), known polyester-based thermoplastic elastomers can be used. The polyester-based thermoplastic elastomer (A12) can be used singly or in combinations of two or more. The polyester-based thermoplastic elastomer (A12) can be produced by a known method such as the esterification reaction or the transesterification reaction.

The polyester-based thermoplastic elastomer (A12) is preferably, for example, polyester-based thermoplastic elastomers having as main constituting units a hard segment composed of an aromatic polyester unit and a soft segment composed of an aliphatic polyether unit and/or an aliphatic polyester unit.

The aromatic polyester unit is mainly a unit formed of an aromatic dicarboxylic acid or an ester-forming derivative thereof (a $C_{1-4}$ alkyl ester, an acid halide or the like) and a diol or an ester-forming derivative thereof (an acetylated derivative, an alkaline metal salt or the like). Specific examples of the aromatic dicarboxylic acid include terephthalic acid, isophthalic acid, phthalic acid, naphthalene-2,6-dicarboxylic acid, naphthalene-2,7-dicarboxylic acid, anthracenedicarboxylic acid, diphenyl-4,4'-dicarboxylic acid, diphenoxyethanedicarboxylic acid, 4,4"-diphenyl ether dicarboxylic acid, 5-sulfoisophthalic acid and sodium 3-sulfoisophthalate. Specific examples of the diol include diols having a molecular weight of not more than 400, and include, for example, aliphatic dials such as 1,4-butanediol, ethylene glycol, trimethylene glycol, pentamethylene glycol, hexamethylene glycol and neopentyl glycol, decamethylene glycol; alicyclic dials such as 1,1-cyclohexanedimethanol, 1,4-dicyclohexanedimethanol and tricyclodecanedimethanol; and aromatic dials such as xylylene glycol, bis(p-hydroxy)diphenyl, bis(p-hydroxy)diphenylpropane, 2,2"-bis[(4-(2-hydroxyethoxy)phenyl)]propane, bis[4-(2-hydroxyethoxy)phenyl]sulfone, 1,1-bis[4-(2- hydroxyethoxy)phenyl]cyclohexane and 4,4'-dihydroxy-p-terphenyl. These aromatic dicarboxylic acids or ester-forming derivatives thereof, and diols and ester-forming derivatives thereof may be concurrently used in two or more, respectively. Preferable aromatic polyester units include a polybutylene terephthalate unit derived from terephthalic acid and/or dimethyl terephthalate and 1,4-butanediol, and a unit composed of a polybutylene terephthalate unit derived from terephthalic acid and/or dimethyl terephthalate and a polybutylene isophthalate unit derived from isophthalic acid and/or dimethyl isophthalate and 1,4-butanediol.

Examples of an aliphatic polyether constituting the aliphatic polyether unit include poly(ethylene oxide)glycols, poly(propylene oxide)glycols, poly(tetramethylene oxide)glycols, poly(hexamethylene oxide)glycols, copolymers of ethylene oxide and propylene oxide, ethylene oxide addition polymers of poly(propylene oxide)glycols and copolymer glycols of ethylene oxide and tetrahydrofuran. Among these, preferable are poly(tetramethylene oxide)glycols, ethylene oxide addition products of poly(propylene oxide)glycols and copolymer glycols of ethylene oxide and tetrahydrofuran. Examples of an aliphatic polyester constituting the aliphatic polyester unit include poly(ε-caprolactone)s, polyenantholactones, polycaprolactones, polybutylene adipates and polyethylene adipates. Among these, preferable are poly(ε-caprolactone)s, polybutylene adipates, polyethylene adipates, and the like.

The soft segment composed of an aliphatic polyether unit and/or an aliphatic polyester unit has a number-average molecular weight of preferably 300 to 6,000, and especially preferably 500 to 4,000, in the copolymerized state.

The ratio of the hard segment composed of an aromatic polyester unit and the soft segment composed of an aliphatic polyether unit and/or an aliphatic polyester unit in the polyester-based thermoplastic elastomer is not especially limited, but is, for example, the former/the latter (weight ratio)=1/99 to 99.5/0.5, and preferably 50/50 to 99/1.

[Polyamide-Based Thermoplastic Elastomer (A13)]

As the polyamide-based thermoplastic elastomer (A13), known polyamide-based thermoplastic elastomers can be used. The polyamide-based thermoplastic elastomer (A13) can be used singly or in combinations of two or more.

As the polyamide-based thermoplastic elastomer (A13), preferable are, for example, polyamide-based thermoplastic elastomers having as main constituting units a hard segment composed of a polyamide unit and a soft segment composed of an aliphatic polyether unit and/or an aliphatic polyester unit.

Examples of a polyamide constituting the polyamide unit include nylon 6, nylon 66, nylon 11 and nylon 12. Examples of an aliphatic polyether constituting the aliphatic polyether unit include the same aliphatic polyethers as exemplified in the term of the polyester-based thermoplastic elastomer. Among these, preferable are poly(tetramethylene oxide) glycols, ethylene oxide additions of poly(propylene oxide) glycols, and copolymer glycols of ethylene oxide and tetrahydrofuran. Examples of an aliphatic polyester constituting the aliphatic polyester unit include the same aliphatic polyesters as exemplified in the term of the polyester-based thermoplastic elastomer. Among these, preferable are poly(ε-caprolactone)s, polybutylene adipates, polyethylene adipates, and the like.

[Other Thermoplastic Elastomers]

As the polystyrenic thermoplastic elastomer (A14), the fluoropolymer-based thermoplastic elastomer (A15), the polyvinyl chloride-based thermoplastic elastomer (A16), the polyolefinic thermoplastic elastomer (A17) and the polyimide-based elastomer (A18), usable are respective known elastomers.

As the thermoplastic resin (A), from the viewpoint of the adhesion with a modified ethylene copolymer (B), preferable are resins having, in the molecule (for example, on the main chain, terminals and side chains of a polymer), functional groups (or functional groups having affinity) reactive, in heating and mixing, with modifying groups (for example, a carboxyl group or its salt, a carboxylate ester group, an acid anhydride group, a carboxylic acid halide group, an amido group, an imido group, a glycidyl group (epoxy group), a halogen atom, an amino group, an imido group, a phosphino group, a thioxy group and a silicon-containing group, which will be described later) of the modified ethylene copolymer (B). Examples of such a resin include thermoplastic resins having, on the terminals of a polymer main chain, functional groups such as a hydroxyl group, a carboxyl group, an amino group and a thiol group, for example, polyamide-based resins, polyester-based resins, polycarbonate-based resins, polyacetal resins, polyphenylene ethers, polyphenylene sulfides, polyurethane-based thermoplastic elastomers (A11), polyester-based thermoplastic elastomers (A12) and polyamide-based thermoplastic elastomers (A13).

[Modified Ethylene Copolymer (B)]

In the present invention, as the modified ethylene copolymer (B), usable are known modified ethylene copolymers. The modified ethylene copolymer (B) can be used singly or in combinations of two or more. The modified ethylene copolymer (B) has a weight-average molecular weight of, for example, 5,000 to 1,000,000, and preferably 10,000 to 500,000.

The modified ethylene copolymer (B) is an ethylene copolymer modified with an unsaturated carboxylic acid or a derivative thereof or another functional group. Examples of the ethylene copolymer include copolymers of ethylene with at least one monomer component selected from (i) olefin components except for ethylene, (ii) diene components and (iii) ester components having an ethylenically unsaturated group. Examples of the olefin component except for ethylene include α-olefins having 3 to 12 carbon atoms such as propylene, 1-butene, 1-pentene, 1-hexene, 1-heptene, 1-octene and 1-decene. Examples of the diene component include non-conjugated dienes such as ethylidene norbornene, dicyclopentadiene and 1,4-hexadiene. Examples of the ester component having an ethylenically unsaturated group include alkyl(meth)acrylate esters such as methyl(meth)acrylate and ethyl(meth)acrylate, and vinyl carboxylate esters such as vinyl acetate and vinyl propionate.

Typical examples of the ethylene copolymer include ethylene-propylene-diene copolymers (ethylene-propylene-diene copolymerized rubber, ethylene-propylene-diene rubbers; EPDM), ethylene-propylene copolymers (ethylene-propylene rubbers; EPM), ethylene-methyl(meth)acrylate copolymers, ethylene-ethyl(meth)acrylate copolymers and ethylene-vinyl acetate copolymers. Among these, especially preferable are ethylene-propylene-diene copolymers (ethylene-propylene-diene rubbers; EPDM) and ethylene-propylene copolymers (ethylene-propylene rubbers; EPM).

Examples of an unsaturated carboxylic acid used for modification of the ethylene copolymer include acrylic acid, methacrylic acid, maleic acid, fumaric acid, tetrahydrophthalic acid, itaconic acid, citraconic acid, crotonic acid, isocrotonic acid and norbornenedicarboxylic acid. Examples of a derivative of an unsaturated carboxylic acid include esters of unsaturated carboxylic acids [for example, glycidyl (meth)acrylate and maleate esters], acid anhydrides (maleic anhydride and the like), salts, acid halides, amides and imides. An ethylene copolymer modified with an unsaturated carboxylic acid or a derivative thereof has, in the molecule, a carboxyl group or a salt thereof, a carboxylate ester, an acid anhydride group, a carboxyl acid halide group, an amido group, an imido group or the like.

Other functional groups used for modification of the ethylene copolymer are not especially limited as long as they are capable of chemically modifying the ethylene copolymer. The other functional groups include, for example, a glycidyl group (epoxy group), a halogen atom, an amino group, an imido group, a phosphino group, a thioxy group, a silicon atom-containing group. These functional groups may be incorporated singly or in two or more.

Modification of an ethylene copolymer can be carried out, for example, by heating and kneading the ethylene copolymer and an unsaturated carboxylic acid or a derivative thereof in the presence of a graft polymerization initiator [for example, a peroxide initiator such as 1,3-bis(t-butylperoxyisopropyl)benzene or dicumyl peroxide]. Modification of an ethylene copolymer can be carried out also by further using an unsaturated carboxylic acid (acrylic acid, methacrylic acid or the like) as another comonomer when ethylene and a comonomer such as an ester having an ethylenically unsaturated bond [methyl(meth)acrylate, ethyl(meth)acrylate, vinyl acetate or the like] are copolymerized. Further, modification of an ethylene copolymer with the above another functional group can also be carried out by a known method. Modification may use a chemical reaction such as random copolymerization, alternating copolymerization, block copolymerization or graft copolymerization, may use a state of a reaction intermediate, or may use a physical modification such as addition, coexistence or generation.

The modification ratio with an unsaturated carboxylic acid or a derivative thereof or the another functional group in the modified ethylene copolymer (B) is, as a content rate of a structural unit containing groups originated (derived) from the unsaturated carboxylic acid or the derivative thereof, or a structural unit containing the another functional group, for example, about 0.1 to 20 wt %, preferably about 0.5 to 10 wt %, and still more preferably about 1 to 8 wt %, with respect to the whole modified ethylene copolymer (a whole amount of the modified ethylene copolymer). If the content rate is too low, the improving effect of the abrasion resistance and the bending fatigue resistance in blending with a thermoplastic resin (A) is liable to become small. By contrast, if the content rate is too high, properties as a copolymer intrinsic to an ethylene copolymer become liable to decrease, making difficult the maintenance of the copolymer and also making difficult the regulation of the properties.

The modification of an ethylene copolymer may be carried out independently for the ethylene copolymer before being blended with a thermoplastic resin, or may be carried out simultaneously in a stage of blending a before-modification ethylene copolymer with a thermoplastic resin. An unreacted carboxylic acid or derivative thereof may be removed, or may be used as it remains.

The modified ethylene copolymer (B) is preferably a copolymer, modified with an unsaturated carboxylic acid or a derivative thereof, of ethylene with at least one monomer component selected from (i) olefin components except for ethylene (particularly, α-olefins containing at least propylene), (ii) diene components and (iii) ester components having an ethylenically unsaturated group. Among these, especially preferable are polymers obtained by modifying a copolymer of ethylene, an olefin except for ethylene (particularly, α-olefin containing at least propylene) and/or a diene with an unsaturated carboxylic acid or a derivative thereof (particularly maleic anhydride).

A preferable modified ethylene copolymer (B) includes modified ethylene-propylene-diene copolymerized rubbers (modified EPDM) (B1), modified ethylene-propylene rubbers (modified EPM) (B2) and carboxylic acid-modified ethylene acryl rubbers (acid-modified ethylene acryl elastomers) (B3). Among these, preferable are modified ethylene-propylene-diene copolymerized rubbers (modified EPDM) (B1).

[Modified Ethylene-Propylene-Diene Copolymerized Rubber (B1)]

In the present invention, as the modified ethylene-propylene-diene copolymerized rubber (B1) (modified EPDM), usable are known modified ethylene-propylene-diene copolymerized rubbers. The modified ethylene-propylene-diene copolymerized rubber (B1) can be used singly or in combinations of two or more.

An ethylene-propylene-diene copolymer (EPDM) is a copolymer of ethylene, propylene and a non-conjugated diene. Examples of the diene include 5-ethylidene-2-norbornene, dicyclopentadiene and 1,4-hexadiene. A modified ethylene-propylene-diene copolymerized rubber (modified EPDM) (B1) used in the present invention is obtained by modifying an EPDM with, for example, an unsaturated carboxylic acid or a derivative thereof (an ester, an acid anhydride, a salt, an acid halide, an amide, an imide, or the like) or another functional group. Examples of the unsaturated carboxylic acid or the derivative thereof include, as in the above, acrylic acid, methacrylic acid, maleic acid, fumaric acid, tetrahydrophthalic acid, itaconic acid, citraconic acid, crotonic acid, isocrotonic acid, norbornenedicarboxylic acid, glycidyl(meth)acrylate, maleate esters and maleic anhydride, and the unsaturated carboxylic acid or the derivative thereof may have a structure of an ester salt, a metal salt thereof and the like. Among these, preferable are acrylic acid, methacrylic acid and maleic anhydride, and especially preferable is maleic anhydride. The another functional group includes, for example, a glycidyl group, a halogen atom, an amino group, an imido group, a phosphino group and a thioxy group.

Modification of an EPDM can be carried out, for example, by heating and kneading the EPDM and an unsaturated carboxylic acid or a derivative thereof in the presence of a graft polymerization initiator [for example, a peroxide initiator such as 1,3-bis(t-butylperoxyisopropyl)benzene or dicumyl peroxide]. The ratio of ethylene and propylene in an EPDM used as a raw material is, from the viewpoint of properties thereof as an elastomer, and the like, for example, the former/the latter (weight ratio)=10/90 to 95/5, and preferably about 50/50 to 85/15. The content rate of a structural unit originated from a diene component in an EPDM is, for example, about 0.1 to 25 wt %, preferably about 1 to 20 wt %, and more preferably about 2 to 10 wt %, to the whole EPDM.

The modification ratio with an unsaturated carboxylic acid or a derivative thereof in the modified ethylene-propylene-diene copolymerized rubber (B1) is, as a content rate of a structural unit originated from the unsaturated carboxylic acid or the derivative thereof, for example, about 0.1 to 20 wt %, preferably about 0.5 to 10 wt %, and more preferably about 1 to 8 wt %, with respect to the whole modified EPDM. If the content rate is too low, the improving effect of the abrasion resistance and the bending fatigue resistance in blending with a thermoplastic resin (A) [for example, the polyurethane-based thermoplastic elastomer (A1)] is liable to become small. By contrast, if the content rate is too high, the function as an elastomer becomes liable to decrease.

The modification of an EPDM may be carried out independently for the EPDM before being blended with a TPU, or may be carried out simultaneously in a stage of blending a before-modification EPDM with a TPU. An unreacted carboxylic acid or a derivative thereof may be removed, or may be used as it remains.

The modified ethylene-propylene-diene copolymerized rubber (B1) has a melt flow rate (ASTM D1238, 280° C./2.16 kg) of, for example, 5 to 80 g/10-min, and preferably 10 to 40 g/10-min.

As the modified ethylene-propylene-diene copolymerized rubber (B1), commercially available products may be used. Examples of the commercially available product include "Fusabond N416" by trade name (maleic anhydride-modified EPDM, Du Pont K.K.).

A modified ethylene-propylene-diene copolymerized rubber (B1) to become a dispersoid in a resin composition may be crosslinked, or uncrosslinked. For example, dynamic crosslinking means, in which crosslinking is carried out with thermoplasticity being maintained, may be used.

Although a modified ethylene-propylene-diene copolymerized rubber (B1) is often crosslinked and then utilized as industrial rubber products so far, and has not been so much used as a modifier for other resins, it has been found according to the present invention that making the copolymerized rubber dispersed and contained in a thermoplastic resin can remarkably improve properties of the thermoplastic resin.

As the modified ethylene-propylene copolymerized rubber (modified EPM) (B2) as well, known in modified ethylene-propylene copolymerized rubbers can be used. The modified ethylene-propylene copolymerized rubber can be used singly or in combinations of two or more. An ethylene-propylene copolymer (EPM) is a copolymer of ethylene and propylene, and the modification of the EPM can be carried out similarly to the modification of the EPDM. As the acid-modified ethylene acryl elastomer (B3) as well, known acid-modified ethylene acryl elastomers can be used. The acid-modified ethylene acryl elastomer (B3) can be used singly or in combinations of two or more.

[Thermoplastic Resin Composition (C)]

The thermoplastic resin composition (C) according to the present invention is a resin composition comprising the thermoplastic resin (A) and the modified ethylene copolymer (B), and the thermoplastic resin composition (C) is obtained by dispersing the modified ethylene copolymer (B) into the thermoplastic resin (A) ((a resin composition comprising the thermoplastic resin (A) and the modified ethylene copolymer (B), and obtained by dispersing the modified ethylene copolymer (B) into the thermoplastic resin (A)), as described above.

In the present invention, the weight proportion [(B)/(A)] of the (B) to (A) is, though depending on the kinds of the components (A) and (B), usually in the range of 0.1/99.9 to 60/40. The lower limit of the proportion (ratio) is preferably 1/99, more preferably 3/97, and especially preferably 7.5/92.5; and the upper limit thereof is preferably 55/45, more preferably 50/50, still more preferably 30/70, and especially preferably 25/75 (particularly, 22/78). More specifically, the weight proportion [(B)/(A)] of the (B) to (A) is preferably 0.1/99.9 to 30/70, more preferably 1/99 to 25/75, and still more preferably 3/97 to 22/78 (particularly, 7.5/92.5 to 22/78). If the proportion is too low, the improving effect of the durability of the abrasion resistance, and the bending fatigue resistance becomes small. By contrast, if the proportion is too high, properties (mechanical strength and the like) intrinsic to the thermoplastic resin become liable to decrease.

The present inventors have found that in a resin composition which is obtained by dispersing a modified ethylene copolymer into a thermoplastic resin and which comprises the thermoplastic resin and the modified ethylene copolymer, the durability such as the bending fatigue resistance of molded articles of the resin composition exhibits a more improved value than a value anticipated for the each material as a single material. That is, it has been found that an actually acquired value of the bending fatigue resistance of a blend of a thermoplastic resin (A) and a modified ethylene copolymer (B) is higher than a value thereof calculated on the assumption of the additivity being held in the blend, thus providing a synergistic effect. For example, in FIG. 5 [which is a graph indicating a relationship between the blend ratio (wt %) of a modified ethylene copolymer (MAH-EPDM) and the bending fatigue resistance, based on data of Examples and Comparative Examples described later], a line (dotted line in FIG. 5) connecting values of the bending numbers of times by a straight line in the cases of the blend ratio of MAH-EPDM being 0 wt % and 100 wt % indicates values of the bending numbers of times in respective blend ratios on the assumption of the additivity being held. By contrast, the result of a resin composition (solid line in FIG. 5) is a result of the bending numbers of times, which are by far more than the dotted line, thus being conceivably a synergistic effect. The synergistic effect is large in the case of using a thermoplastic elastomer (A1) as the thermoplastic resin (A) (for example, a polyurethane-based thermoplastic elastomer), and is remarkable particularly in the case of using a modified ethylene-propylene-diene copolymerized rubber as the modified ethylene copolymer (B).

In the thermoplastic resin composition (C), in addition to the above (A) and (B), as required, additives can be blended. Examples of the additives include antioxidants, ultraviolet absorbers, plasticizers, stabilizers, mold lubricants, surfactants, antistatic agents, electroconductive materials, colorants (pigments, dyes), flame retardants, foaming agents, slip agents, lubricants, bulking agents, crosslinking agents, solvents, developing solutions, extenders, waxes, oils, greases, processing aids, processing agents, reinforcing materials, fillers, antiblocking agents and antiaging agents.

In the thermoplastic resin composition (C), in addition to the above (A) and (B), as required, reinforcing materials can be incorporated. Examples of the reinforcing materials include fibers, powders, clothes, substrate materials, long fibers, short fibers, glass clothes, fabrics, carbon nanotubes, fullerenes, graphites, carbon blacks, silicas, foams, beads, inorganic fillers, heat dissipation fillers, electroconductive fillers, ceramics, fine ceramics and carbon fibers.

In the thermoplastic resin composition (C), the total content of the thermoplastic resin (A) and the modified ethylene copolymer (B) is, for example, not less than 60 wt %, preferably not less than 80 wt %, and more preferably not less than 90 wt %.

The modified ethylene copolymer (B) in the thermoplastic resin composition (C) has preferably an average dispersed particle aspect ratio (=major diameter/minor diameter) of 1 to 3.5, more preferably 1 to 3, and much more preferably 1 to 2. An average dispersed particle aspect ratio near 1 means that in an actual thermoplastic resin composition, the shape (disperse shape) of the (B) dispersed is near a true sphere.

Here, the average dispersed particle aspect ratio is calculated from a major diameter/a minor diameter of island phases (disperse phase) in a planarized visual field when a disperse state of a material at an arbitrary place of a thermoplastic resin composition is observed by known means (SEM, TEM, AFM or the like). The modified ethylene copolymer (B) in the thermoplastic resin composition (C) has preferably an average dispersed particle diameter of not more than 3 μm, and more preferably not more than 1 μm. An average dispersed particle aspect ratio nearer 1, that is, nearer a true sphere, is better. A smaller average dispersed particle diameter is better. If the average dispersed particle aspect ratio is in the above range, since the degree of anisotropicity is very low and there is no directivity, a high rigidity is exhibited on stresses from every direction. Consequently, the dispersed particle exhibits the effect as a reinforcing filler in every direction.

The average dispersed particle aspect ratio and the average dispersed particle diameter can be measured by a scanning electron microscope (SEM), a transmission electron microscope (TEM), further an atomic force microscope (AFM), and the like.

The hardness of the thermoplastic resin composition (C) is not especially limited, but the hardness in JIS K6253 (durometer type A) is preferably not less than 60 (for example, 60 to 95), more preferably not less than 78 (for example, 78 to 95), still more preferably not less than 89 (for example, 89 to 95), and especially preferably not less than 91 (for example, 91 to 95). From the viewpoint of having a reasonable flexibility and enhancing the bending fatigue resistance, the hardness of the thermoplastic resin composition (C) is, for example, in the range of 60 to 93, and especially preferably in the range of 77 to 91 (particularly 77 to 88). The hardness of the thermoplastic resin composition (C) can be regulated by the hardness of a thermoplastic resin (A), the weight proportion of the modified ethylene copolymer (B) to the thermoplastic resin (A), the kinds and amounts of additives, and the like.

The breaking strength (JIS K7311) of the thermoplastic resin composition (C) depends largely on a resin to become a continuous phase (sea phase). The breaking strength (JIS K7311) of the thermoplastic resin composition (C) is, for example, 25 to 100 MPa, preferably 30 to 80 MPa, and more preferably 35 to 75 MPa; and the breaking elongation (JIS K7311) is, for example, 300 to 1,000%, preferably 350 to 800%, and more preferably 400 to 700%.

The thermoplastic resin composition (C) can be produced by mixing the thermoplastic resin (A), the modified ethylene copolymer (B), and the additives used according to needs by the same method as the case of preparing usual polymer alloys or polymer blends. For example, the thermoplastic resin composition can be produced by pre-mixing the thermoplastic resin (A), the modified ethylene copolymer (B), and the additives used according to needs in predetermined proportions, and thereafter, kneading the mixture under heating, under pressure, in the presence of a solvent or the like by using a single-screw extruder, a twin-screw extruder, a mixing roll, a Banbury mixer, a batch-type kneader, a reactor, a reactive molding machine, an injection molding machine or the like. In the case of carrying out heating and kneading using an extruder, the composition is extruded in a strand form, and may be cut into a suitable length to thereby make a granule such as a pellet. Besides the above method, the thermoplastic resin composition (C) can be produced also by charging and mixing the modified ethylene copolymer (B) and/or the additives during the production of the thermoplastic resin (A). In the case of using a thermoplastic elastomer (A1) such as a thermoplastic polyurethane (polyurethane-based thermoplastic elastomer) as the thermoplastic resin (A), a thermoplastic elastomer alloy can be obtained.

The average dispersed particle aspect ratio and the average dispersed particle diameter of the modified ethylene copolymer (B) in the thermoplastic resin composition (C) can be regulated by the kinds and the degrees of crosslinking of the thermoplastic resin (A) and the modified ethylene copolymer (B), the viscosity ratio and the volume ratio of the thermoplastic resin (A) and the modified ethylene copolymer (B), the magnitude of a shearing force impressed in kneading a mixture containing the thermoplastic resin (A) and the modified ethylene copolymer (B), and the like. In more detail, the disperse state of the composition can be controlled by regulating respective amounts (vol %) and shearing viscosities of the thermoplastic resin (A) and the modified ethylene copolymer (B) and regulating a molding method and the like, for example, at a temperature and a shearing rate at which both the thermoplastic resin (A) and the modified ethylene copolymer (B) become flowable. In a completely incompatible blend system, the case where one component has a higher vol % than the other or the case where one component has a lower shearing viscosity than the other basically takes a sea-island structure; and the higher-vol % and/or lower-shearing viscosity component forms a sea side (continuous phase). The case where respective vol % and shearing viscosities approach closely provides a structure in which both components form micro-continuous phases. On the other hand, the case where the shearing viscosity of a sea component becomes higher than that of an island component due to a reaction of the components during kneading includes a case where the sea-island structure reverses during the kneading; and a dual-continuous phase develops, though being a very complicate structure, during the phase transformation. The reaction used here may be a crosslinking (curing) of one component, or may involve a viscosity decrease due to a molecular weight decreasing phenomenon by transesterification, hydrolysis and the like of the other component. In the case of a dual-continuous phase, although the average dispersed particle aspect ratio becomes large, since a shearing force can be most highly transmitted to both components, a micro-dispersion can be provided if kneading is carried out through this process. Further in a sea-island structure, with respect to the shape of the island side, a shape near a spherical one is resultantly obtained in the case where an island-side resin is strongly and quickly kneaded in a sea-side resin having a relatively low shearing viscosity as compared with the island side rather than in the case where both the components have shearing viscosities close to each other. For example, by using the above-mentioned resin kneading machine for a suitable time (for example, 30 sec to 15 min) and at a suitable shearing force according to the materials and the like, the average dispersed particle aspect ratio and the average dispersed particle diameter of the modified ethylene copolymer (B) can be made in the above-mentioned range. The composition is returned to normal temperature at a rate as near quenching as possible so that these disperse states are not destroyed. Thereby, a thermoplastic resin composition having a desired fixed disperse state can be obtained. As described above, the simultaneous satisfaction of both the spherical dispersion and the micro-dispersion is difficult. However, by designing the viscosities, the amounts and the kinds of components of the thermoplastic resin composition, the kneading method and the molding condition, the present invention can achieve the simultaneous satisfaction of both, and can obtain a thermoplastic resin composition more excellent in the durability.

The thermoplastic resin composition (C) can be subjected to melt molding, thermal processing, press molding and the like, and can provide various types of molded articles by an optional method such as extrusion, injection molding, blow molding, calendar molding, casting, coating, sheeting and lamination.

A production method of molded articles of the thermoplastic resin composition (C) is not especially limited; molding may be carried out after the thermoplastic resin composition is fabricated in advance, or the thermoplastic resin composition (C) can also be produced simultaneously when molding is carried out (for example, a side feed system and a dry blend system). The side feed system is a method in which for example, two components are charged from different feeders to an extruder in order to regulate mutual melt states to be blended in a polymer blend. The dry blend system involves mixing resin materials to be blended in a pellet form in advance and charging the mixture in the state in a molding machine (a resin molding machine such as an extruder or an injection molding machine). The thermoplastic resin composition (C) suffices if holding thermoplasticity in the fabrication time of the composition, and after the fabrication, may or may not have the thermoplasticity. There are cases where a final product is a resin composition having no thermoplasticity, for example, by addition of a crosslinking agent.

[Production of Belt]

Conveyance belts and transmission belts require bending fatigue resistance, abrasion resistance, heat resistance, durability and the like as a flat belt, V belt or the like. Belts are usually imparted with a tensile force and used in an elongated state. Belts are used in combination with resin-made or metal-made pulleys rotating at a high speed, and are contacted with pulleys, cause to be wound round pulleys and to fit thereon, and are exposed to collision with and rubbing on conveyed materials, and the like. The thermoplastic resin composition (C), since being excellent particularly in the bending fatigue resistance, can effectively be used as belts used in layouts in which the belts undergo severe bending fatigue, such as layouts in which a plurality of pulleys are combined and layouts having small-diameter pulleys. A too soft belt causes creeping deformation and the like, and reduces the life; and a too hard belt gives a large abrasion amount and the like, and also reduces the life. Having reasonable flexibility, abrasion resistance and bending fatigue resistance gives a highest performance to belts. Belts are usually produced in a long shape by laminating a resin or an elastomer with a fiber, a woven fabric or the like by a thermoplastic molding machine of extrusion or the like. The belts are used as they are in some cases, but usually, are subjected to endless processing and used in the state of having a continuous belt back surface.

The thermoplastic resin composition (C) (thermoplastic elastomer alloy or the like), since being capable of being melt molded or thermally processed, can be produced by utilizing an optional molding method such as extrusion, injection molding, blow molding, calendering or casting.

Figure 11:
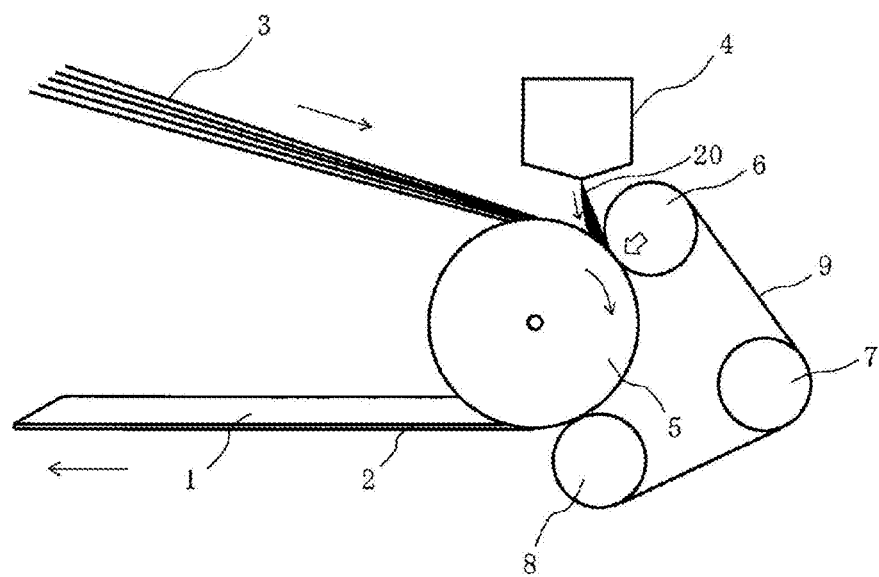
FIG. 11 is a schematic perspective diagram illustratively showing one example of a method for producing the belt according to the present invention.

FIG. 11 is a schematic perspective diagram illustratively showing one example of a method for producing the belt according to the present invention. In this example, the thermoplastic resin composition (C) (thermoplastic elastomer alloy or the like) is continuously melt extruded in a sheet form with an extruder 4 from a die (T-die) at the end thereof; while the melt resin 20 (thermoplastic resin) is poured, at the vicinity of the die, into a cavity formed between the surface of a mold roll 5 for molding a belt (flat belt or the like) 1 as an object and a steel band 9; and core wires 3 (aramid cords, glass cords, steel cords or the like) are drawn in to thereby mold the belt. A press roll 6, a roll 7 and a roll 8 are disposed in the vicinity of the molding mold roll 5; the steel band 9 is stretched between each roll 6 to 8, and is made to turn together in cooperation with the molding mold roll 5. The core wires 3 are embedded in the melt resin by a pressure of the molding mold roll 5 and the steel band 9 to thereby mold a long-sized belt (flat belt or the like) 1.

An endless belt can be manufactured as follows from the long-sized belt thus obtained. That is, the long-sized belt obtained above is cut into a necessary length by a certain-width finger (W)-shaped blade; both ends of the cut belt are abutted, and set in a mold having a convexo-concave shape conforming to a belt tooth profile on the surface; and the abutted portion is fused by hot press to form a joint to thereby make an endless belt. Here, although the core wires (steel cords or the like) are divided at the cut portions, the resin portions fuse and are united to thereby hold a strength necessary as a belt. An endless belt may be a seamless belt having no joint. The seamless belt having no joint makes a further highly durable belt.

The belt according to the present invention is excellent not only in abrasion resistance but also in bending fatigue resistance, and hardly causes abrasion, damage, cracks, breakage and the like even if being continuously or intermittently used at a high load for a longtime, and is thus remarkably excellent in durability and has an elongated life.

EXAMPLES

Hereinafter, the present invention will be described more specifically by way of Examples and Comparative Examples. The present invention is not any more limited thereto. The average dispersed particle aspect ratio and the average dispersed particle diameter of dispersed particles in a thermoplastic resin composition (thermoplastic elastomer alloy or the like) were measured by a scanning electron microscope (SEM), a transmission electron microscope (TEM) and an atomic force microscope (AFM).

Materials used in Examples and the like are shown below.

<Thermoplastic Resin (A)>

(1) TPU-1: an adipate-based TPU (thermoplastic polyurethane) of 90 in hardness (2) TPU-2: a caprolactone-based TPU (thermoplastic polyurethane) of 90 in hardness (3) TPU-3: a PTMG-based TPU (thermoplastic polyurethane) of 92 in hardness (4) TPU-4: an adipate-based TPU (thermoplastic polyurethane) of 92 in hardness (5) TPU-5: an adipate-based TPU (thermoplastic polyurethane) of 80 in hardness (6) TPEE: trade name "Hytrel 4777" (a thermoplastic polyester elastomer, made by Du Pont-Toray Co., Ltd.)

(7) TPAE: trade name "UBESTA XPA 9040X1" (a thermoplastic polyamide elastomer, made by Ube Industries, Ltd.)

(8) POM: trade name "Duracon M90-44" (a polyacetal resin, made by Polyplastics Co., Ltd.)

(9) PEN: trade name "Teonex TN8065S" (a polyethylene naphthalate resin, made by Teijin Chemicals Ltd.)

<Modified Ethylene Copolymer (B)>

(1) MAH-EPDM: trade name "Fusabond N416" (a maleic anhydride-modified ethylene-propylene-diene copolymerized rubber, made by Du Pont K.K.)

(2) X-EA: trade name "Baymac" (an acid-modified ethylene acryl elastomer, made by Du Pont K.K.)
(3) MAH-EPM: trade name "Tafiner MP0610" (a maleic anhydride-modified ethylene-propylene copolymerized rubber, made by Mitsui Chemicals Inc.)

<Ethylene-Propylene-Diene Copolymerized Rubber>
EPDM: trade name "EP21" (an ethylene-propylene-diene copolymerized rubber, made by JSR Corp.)

Example 1

100 parts by weight of TPU-1 and 10 parts by weight of MAH-EPDM were kneaded using a twin-screw extruder (made by Technovel Corp., trade name "KZW20TW-30"). The extruder was set at a barrel temperature of 200° C. (here, a feeder portion temperature of 160° C.) and a screw rotation frequency of 300 rpm; and the resins were melt kneaded, and passed through a pelletizer to thereby fabricate a pellet. The obtained pellet was injection molded using an injection molding machine (made by Nissei Plastic Industrial Co., Ltd., trade name "NEX110-18E") to thereby fabricate test pieces [100 mm×100 mm×2 mm thick (for abrasion test), 120 mm×10 mm×4 mm thick (for Demattia flex test)].

Comparative Example 1

A pellet and test pieces were fabricated by the same operation as in Example 1, except for using 100 parts by weight of TPU-1 alone as a raw material resin.

Example 2

A pellet and test pieces were fabricated by the same operation as in Example 1, except for using 100 parts by weight of TPU-2 and 10 parts by weight of MAH-EPDM as raw material resins.

Comparative Example 2

A pellet and test pieces were fabricated by the same operation as in Example 1, except for using 100 parts by weight of TPU-2 alone as a raw material resin.

Example 3

A pellet and test pieces were fabricated by the same operation as in Example 1, except for using 100 parts by weight of TPU-3 and 5 parts by weight of MAH-EPDM as raw material resins. An MAH-EPDM particle in an obtained thermoplastic elastomer alloy had an average dispersed particle aspect ratio of 1.23 and an average dispersed particle diameter of 0.35 μm.

Example 4

A pellet and test pieces were fabricated by the same operation as in Example 1, except for using 100 parts by weight of TPU-3 and 10 parts by weight of MAH-EPDM as raw material resins. An MAH-EPDM particle in an obtained thermoplastic elastomer alloy had an average dispersed particle aspect ratio of 1.11 and an average dispersed particle diameter of 0.42 μm.

Example 5

A pellet and test pieces were fabricated by the same operation as in Example 1, except for using 100 parts by weight of TPU-3 and 20 parts by weight of MAH-EPDM as raw material resins. An MAH-EPDM particle in an obtained thermoplastic elastomer alloy had an average dispersed particle aspect ratio of 1.08 and an average dispersed particle diameter of 0.52 μm.

Comparative Example 3

A pellet and test pieces were fabricated by the same operation as in Example 1, except for using 100 parts by weight of TPU-3 alone as a raw material resin.

Comparative Example 4

A pellet and test pieces were fabricated by the same operation as in Example 1, except for using 100 parts by weight of TPU-3 and 10 parts by weight of EPDM as raw material resins. An EPDM particle in an obtained thermoplastic elastomer alloy had an average dispersed particle aspect ratio of 1.1 and an average dispersed particle diameter of 5.8 μm.

Example 6

A pellet and test pieces were fabricated by the same operation as in Example 1, except for using 100 parts by weight of TPU-4 and 5 parts by weight of MAH-EPDM as raw material resins. An MAH-EPDM particle in an obtained thermoplastic elastomer alloy had an average dispersed particle aspect ratio of 1 and an average dispersed particle diameter of 0.62 μm.

Example 7

A pellet and test pieces were fabricated by the same operation as in Example 1, except for using 100 parts by weight of TPU-4 and 10 parts by weight of MAH-EPDM as raw material resins. An MAH-EPDM particle in an obtained thermoplastic elastomer alloy had an average dispersed particle aspect ratio of 1.08 and an average dispersed particle diameter of 0.52 μm.

Example 8

A pellet and test pieces were fabricated by the same operation as in Example 1, except for using 100 parts by weight of TPU-4 and 20 parts by weight of MAH-EPDM as raw material resins. An MAH-EPDM particle in an obtained thermoplastic elastomer alloy had an average dispersed particle aspect ratio of 1.85 and an average dispersed particle diameter of 0.77 μm.

Example 9

A pellet and test pieces were fabricated by the same operation as in Example 1, except for using 100 parts by weight of TPU-5 and 10 parts by weight of MAH-EPDM as raw material resins.

Comparative Example 5

A pellet and test pieces were fabricated by the same operation as in Example 1, except for using 100 parts by weight of TPU-4 alone as a raw material resin.

Comparative Example 6

A pellet and test pieces were fabricated by the same operation as in Example 1, except for using 100 parts by weight of TPU-4 and 10 parts by weight of EPDM as raw material resins. An EPDM particle in an obtained thermoplastic elastomer alloy had an average dispersed particle aspect ratio of 1.1 and an average dispersed particle diameter of 3.2 μm.

Evaluation Test A

<Taber Abrasion Test>

An abrasion loss (mg) after the rotation number of 1,000 times using a Taber abrasion tester using an abrasion wheel H-22 at a load of 9.8 N was measured for the test piece of 100 mm×100 mm×2 mm thick, according to JIS K7311. The results are shown in Table 1.

<Bending Fatigue Test (Bending Crack-Growing Test)>

A Demattia flex test was carried out according to JIS K6260. A notch of 0.5 mm in depth was cut across the nearly entire length in the width direction of a middle portion of the long side (a position of 60 mm from the end in the longitudinal direction) on the strip test piece of 120 mm×10 mm×4 mm thick, and the notched test piece was provided for the test. The test was carried out under the condition of a maximum distance between chucks of 80 mm, a motion distance between the chucks of 70 mm and a bending speed of 97 times/min, and a bending number of times (bending fatigue number of times) until the depth of a crack from the notch of the test piece reached 3.5 mm was measured. The results are shown in Table 1.

<Hardness>

A hardness was measured according to JIS K6253 (durometer type A). The pellet was injection molded by an injection molding machine (made by Nissei Plastic Industrial Co., Ltd., trade name "NEX110-18E") to thereby fabricate test pieces of 100 mm×100 mm×2 mm thick; three sheets thereof were stacked to thereby prepare a test piece of 6 mm in thickness; and a measurement of a hardness was carried out using the stacked test piece. The results are shown in Table 1.

<Tensile Test>

A tensile test was carried out according to JIS K7311, and a breaking strength (MPa) and a breaking elongation (%) were determined. The results are shown in Table 1. Test pieces for the tensile test were fabricated by stamping out the test pieces for the abrasion test.

<Disperse State Checking Test (SEM Observation and AFM Observation)>

Cross-sections of the pellets obtained by a twin-screw extruder were cut out by a freezing microtome, and observed using a scanning electron microscope (made by Hitachi High-Technologies Corp., trade name "S-4300") at a magnification of 2,000 times. A SEM photograph of a cross-section of the pellet obtained in Comparative Example 4 is shown in FIG. 1; a SEM photograph of a cross-section of the pellet obtained in Example 4, in FIG. 2; a SEM photograph of a cross-section of the pellet obtained in Comparative Example 6, in FIG. 3; and a SEM photograph of a cross-section of the pellet obtained in Example 7, in FIG. 4. Cross-sections of the pellets were further observed using an atomic force microscope (AFM). An AFM photograph of a cross-section of the pellet obtained in Example 4 is shown in FIG. 9; and an AFM photograph of a cross-section of the pellet obtained in Example 7 is shown in FIG. 10.

Figure 2:
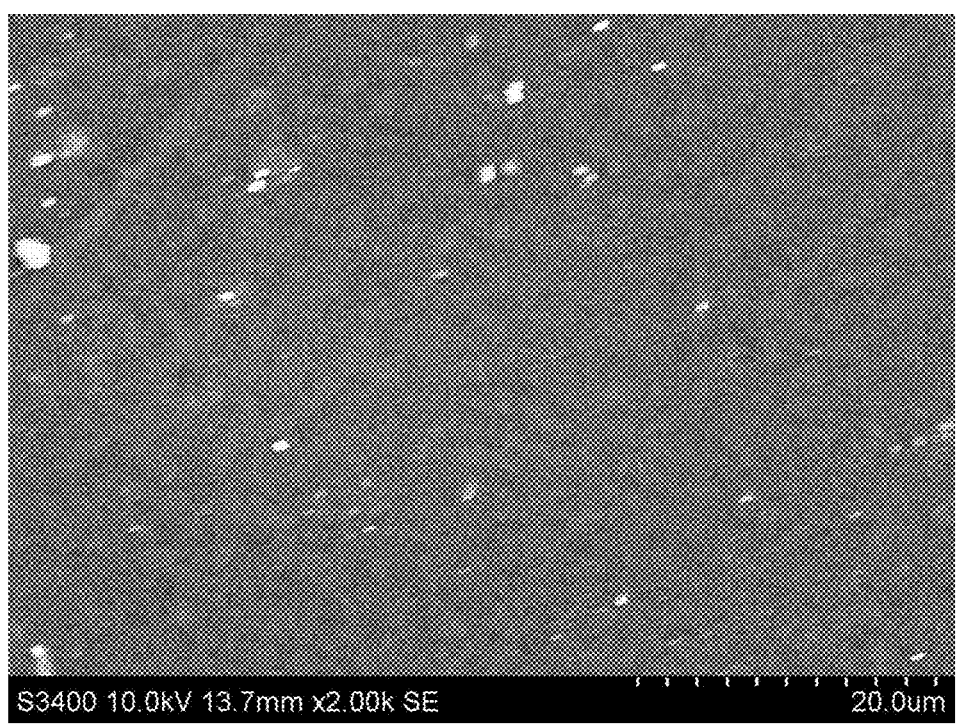
FIG. 2 is a SEM photograph of a pellet cross-section of a thermoplastic elastomer alloy (an alloy of a maleic anhydride-modified EPDM and an etheric TPU) obtained in Example 4.
Figure 3:
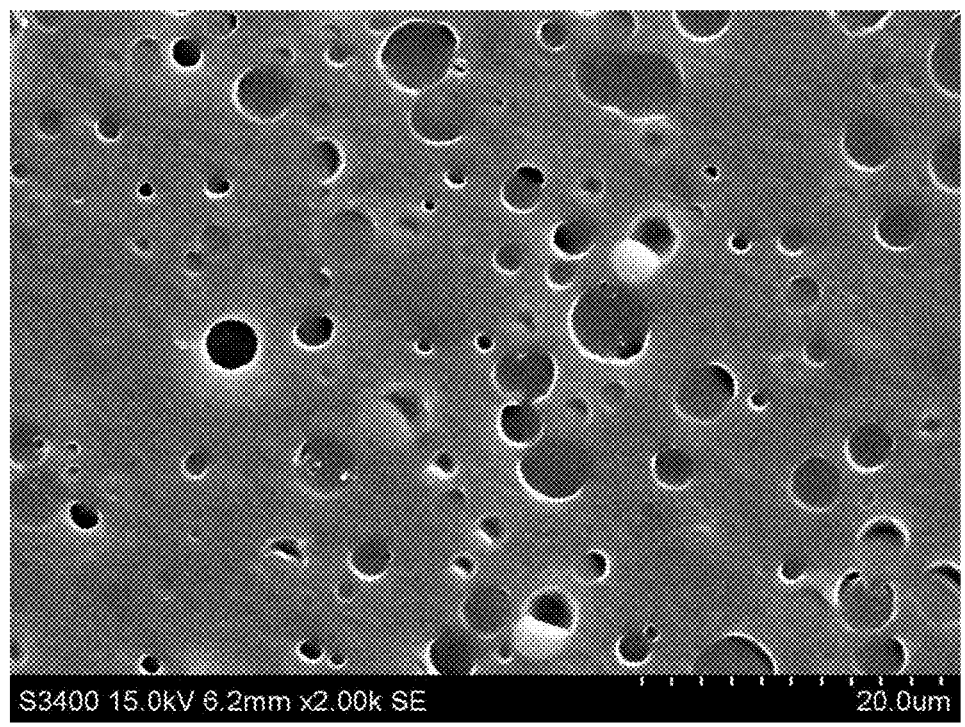
FIG. 3 is a SEM photograph of a pellet cross-section of a thermoplastic elastomer alloy (an alloy of an EPDM and an esteric TPU) obtained in Comparative Example 6.
Figure 4:
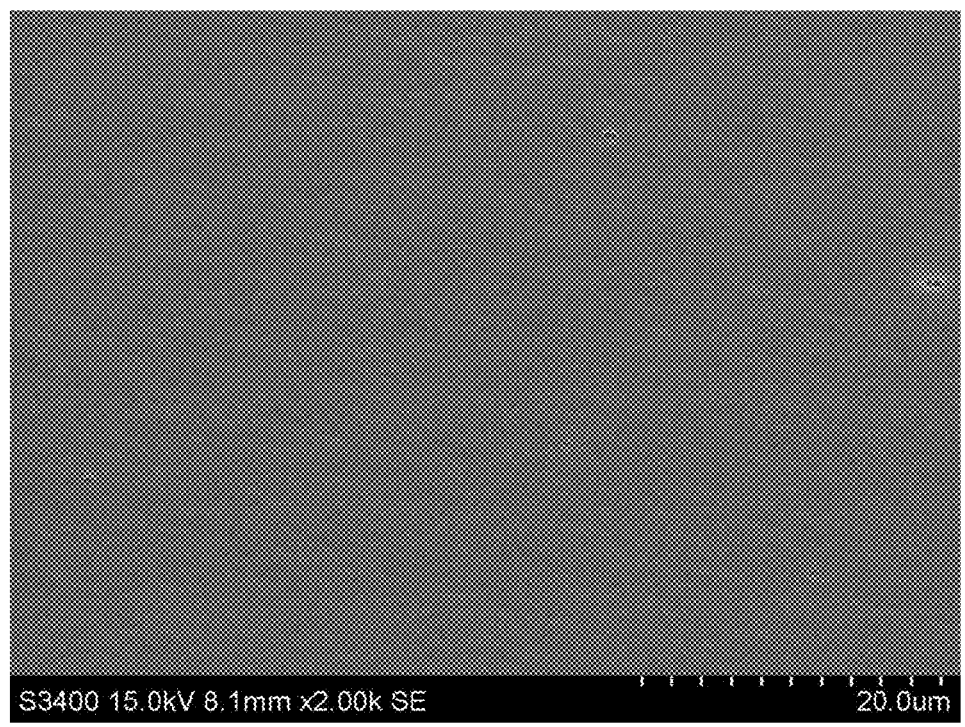
FIG. 4 is a SEM photograph of a pellet cross-section of a thermoplastic elastomer alloy (an alloy of a maleic anhydride-modified EPDM and an esteric TPU) obtained in Example 7.

Observation of molded article cross-sections of the thermoplastic resin compositions (thermoplastic elastomer alloys) obtained in the above Examples by a scanning electron microscope (SEM) reveals that a modified ethylene copolymer (modified ethylene-propylene-diene copolymerized rubber) is highly microdispersed in a matrix comprising a thermoplastic polyurethane (see FIGS. 2 and 4). For example, according to the SEM photographs of a magnification of 2,000 times, in a thermoplastic elastomer alloy comprising a modified EPDM and an etheric TPU, although unevenness is slightly observed, no particle shape cannot be confirmed; and in a thermoplastic elastomer alloy comprising a modified EPDM and an esteric TPU, even almost no unevenness is observed. By contrast, in the case of using a non-modified EPDM in place of a modified EPDM, particles of the EPDM are clearly confirmed, and particularly in a thermoplastic elastomer alloy comprising the EPDM and an esteric TPU, it is clearly observed that spherical particles of the EPDM are dispersed in a matrix of the esteric TPU. The average particle diameter of the particles observed at this time is a value exceeding 3 μm. That the dispersibility is remarkably improved in the thermoplastic elastomer alloy comprising the modified EPDM and the TPU (particularly the esteric TPU) is presumably because the polarity of modified sites in the modified EPDM has affinity for polar sites of the TPU.

Figure 9:
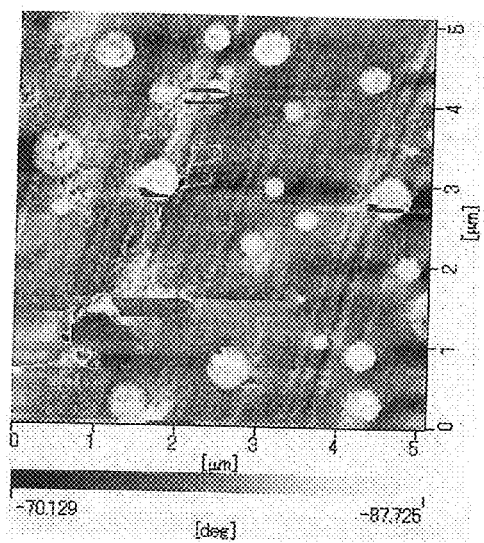
FIG. 9 is an AFM photograph of a pellet cross-section of a thermoplastic elastomer alloy (an alloy of a maleic anhydride-modified EPDM and an etheric TPU) obtained in Example 4.
Figure 10:
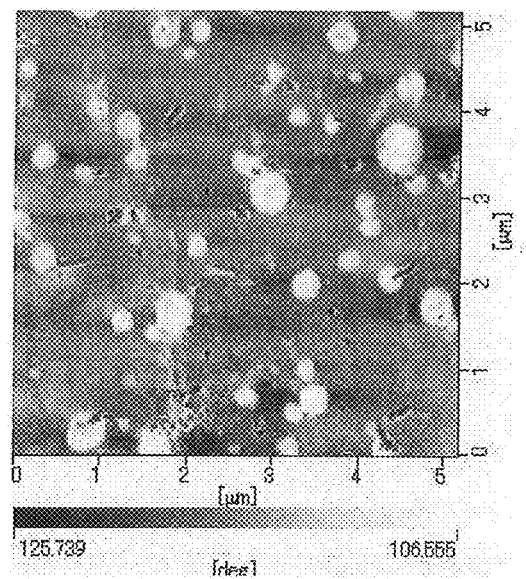
FIG. 10 is an AFM photograph of a pellet cross-section of a thermoplastic elastomer alloy (an alloy of a maleic anhydride-modified EPDM and an esteric TPU) obtained in Example 7.

Further observation of molded article cross-sections of the thermoplastic resin compositions (thermoplastic elastomer alloys) obtained in the above Examples by using an atomic force microscope (AFM) reveals that particles of the modified EPDM in the matrix (thermoplastic polyurethane), which are not observed by SEM, are observed and are highly microdispersed (see FIGS. 9 and 10). According to these AFM photographs, it is found that the particles are dispersed in an average dispersed particle diameter of not more than 1 μm in either of the thermoplastic elastomer alloy comprising the modified EPDM and the etheric TPU and the thermoplastic elastomer alloy comprising the modified EPDM and the esteric TPU. Collectively considering these results and the above-mentioned results by the SEM photographs, the effect of the affinity of modified sites for the matrix on the dispersion is clear.

From the evaluation results shown in Table 1, it is clear that the molded articles formed from the thermoplastic resin composition (thermoplastic elastomer alloy) used in the present invention are remarkably better not only in the Taber abrasion loss but also in the bending fatigue resistance than the molded articles formed from a thermoplastic resin (thermoplastic polyurethane) alone, and the molded articles formed from a thermoplastic elastomer alloy composed of a thermoplastic resin (thermoplastic polyurethane) and a non-modified ethylene-propylene-diene copolymerized rubber. The case where a modified ethylene-propylene-diene copolymerized rubber is added can improve the abrasion resistance and the bending fatigue resistance without spoiling the material property of a thermoplastic polyurethane. Although even the case where a non-modified ethylene-propylene-diene copolymerized rubber is added exhibits an improving affect in some degree of the bending fatigue resistance in some cases, the cases of largely improving the abrasion resistance and the bending fatigue resistance are cases of a thermoplastic polyurethane alloyed with a modified ethylene-propylene-diene copolymerized rubber. From the results of the disperse state checking test, it is clear that the disperse states are better in order of an esteric TPU-EPDM<an etheric TPU-EPDM<an etheric TPU-maleic anhydride-modified EPDM<an esteric TPU-maleic anhydride-modified EPDM. It is further clear from the AFM photograph that any of the thermoplastic elastomer alloys composed of a modified EPDM and an etheric TPU and the thermoplastic elastomer alloys composed of a modified EPDM and an esteric TPU are dispersed in an average dispersed particle diameter of not more than 1 μm.

The reason why the Taber abrasion and the bending number of times are remarkably improved is conceivably that a retardation effect of crack extension of the microdispersion of the modified ethylene copolymer component having an energy absorbing effect changes states from the severe abrasion progress called adhesion wearing of TPU to the mild abrasion progress. This is because the thermoplastic elastomer alloy is obtained as a combination in which a modified ethylene copolymer component (elastomer component) is near a spherical shape like a micro phase separation structure, and microdispersed in a TPU. In a simply blended state in no consideration of compatibility and shearing viscosity, the shape of the island (dispersoid) is usually irregular and in a mechanically crushed-like shape in many cases, and then, the adhesive force between the island layer (disperse phase) and the sea layer (continuous phase) is weak; exfoliation is liable to be caused at the interface when a stress is impressed on molded articles; and the resistance to crack generation also from the island shape becomes poor. These cause inferior durability in some cases. However, the thermoplastic resin composition, by increasing the adhesive surface of the island layer (disperse phase) and the sea layer (continuous phase) and raising the adhesive force, can provide a disperse form in which the island layer (disperse phase) is microdispersed and in a nearly true spherical shape, and can be remarkably improved in the durability under the motion condition impressed with repeated loads, stresses and deformations. Nobody has developed such properties and confirmed the effects, and the properties and effects have been found by exhaustive devices by the present inventors.

TABLE 1

|  | Example 1 | Comp. Ex. 1 | Example 2 | Comp. Ex. 2 | Example 3 | Example 4 | Example 5 | Comp. Ex. 3 |
|---|---|---|---|---|---|---|---|---|
| TPU-1 | 100 | 100 |  |  |  |  |  |  |
| TPU-2 |  |  | 100 | 100 |  |  |  |  |
| TPU-3 |  |  |  |  | 100 | 100 | 100 | 100 |
| TPU-4 |  |  |  |  |  |  |  |  |
| TPU-5 |  |  |  |  |  |  |  |  |
| MAH-EPDM (phr) | 10 |  | 10 |  | 5 | 10 | 20 |  |
| MAH-EPM (phr) |  |  |  |  |  |  |  |  |
| EPDM (phr) |  |  |  |  |  |  |  |  |
| Taber Abrasion Amount (mg) | 9.3 | 12.9 | 6.3 | 11.5 | 8.1 | 8.5 | 8.5 | 12.5 |
| Bending Number Of Times (times) | 400,000 | 5,000 | 18,000 | 3,000 | 8,000 | 250,000 | 170,000 | 3,000 |
| JIS A Hardness | 90 | 92 | 87 | 88 | 92 | 92 | 90 | 92 |
| Breaking Strength (MPa) | — | — | — | — | — | — | — | — |
| Breaking Elongation (%) | — | — | — | — | — | — | — | — |
| Aspect Ratio | — | — | — | — | 1.23 | 1.11 | 1.08 | — |
| Average Dispersed Particle Diameter | — | — | — | — | 0.35 | 0.42 | 0.52 | — |

|  | Comp. Ex. 4 | Example 6 | Example 7 | Example 8 | Comp. Ex. 5 | Comp. Ex. 6 | Example 9 |
|---|---|---|---|---|---|---|---|
| TPU-1 |  |  |  |  |  |  |  |
| TPU-2 |  |  |  |  |  |  |  |
| TPU-3 | 100 |  |  |  |  |  |  |
| TPU-4 |  | 100 | 100 | 100 | 100 | 100 |  |
| TPU-5 |  |  |  |  |  |  | 100 |
| MAH-EPDM (phr) |  | 5 | 10 | 20 |  |  | 10 |
| MAH-EPM (phr) |  |  |  |  |  |  |  |
| EPDM (phr) | 10 |  |  |  |  | 10 |  |
| Taber Abrasion Amount (mg) | 12.4 | 11 | 6.8 | 10.8 | 16.4 | 16.6 | 7.4 |
| Bending Number Of Times (times) | 40,000 | 15,000 | 330,000 | 270,000 | 5,000 | 17,000 | 1,800,000 |
| JIS A Hardness | 91 | 93 | 93 | 91 | 95 | 91 | 79 |
| Breaking Strength (MPa) | — | 57 | 47 | 38 | 52 | — | — |

TABLE 1-continued

| | | | | | | | |
|---|---|---|---|---|---|---|---|
| Breaking Elongation (%) | — | 560 | 510 | 490 | 520 | — | — |
| Aspect Ratio | 1.1 | 1 | 1.08 | 1.85 | — | 1.1 | — |
| Average Dispersed Particle Diameter | 5.8 | 0.62 | 0.52 | 0.77 | — | 3.2 | — |

Example 10

A pellet and test pieces were fabricated by the same operation as in Example 1, except for using 100 parts by weight of TPU-4 and 150 parts by weight of MAH-EPDM as raw material resins.

Comparative Example A

A pellet and test pieces were fabricated by the same operation as in Example 1, except for using 100 parts by weight of MAH-EPDM alone as a raw material resin.

Example 11

An Example Using a Polyester-Based Thermoplastic Elastomer

A pellet and test pieces were fabricated by the same operation as in Example 1, except for using 100 parts by weight of TPEE and 10 parts by weight of MAH-EPM as raw material resins.

Comparative Example 7

A pellet and test pieces were fabricated by the same operation as in Example 1, except for using 100 parts by weight of TPEE alone as a raw material resin.

Example 12

An Example Using a Polyamide-Based Thermoplastic Elastomer

A pellet and test pieces were fabricated by the same operation as in Example 1, except for using 100 parts by weight of TPAE and 10 parts by weight of MAH-EPDM as raw material resins.

Comparative Example 8

A pellet and test pieces were fabricated by the same operation as in Example 1, except for using 100 parts by weight of TPAE alone as a raw material resin.

Example 13

An Example Using a Polyacetal Resin

A pellet and test pieces were fabricated by the same operation as in Example 1, except for using 100 parts by weight of POM and 10 parts by weight of MAH-EPDM as raw material resins.

Comparative Example 9

A pellet and test pieces were fabricated by the same operation as in Example 1, except for using 100 parts by weight of POM alone as a raw material resin.

The above-mentioned evaluation tests were carried out using the test pieces obtained in Examples 10 to 13, Comparative Example A and Comparative Examples 7 to 9. In Example 11 and Comparative Example 7, the hardnesses were values measured according to JIS K6253 (durometer type D). The results are shown in Table 2.

TABLE 2

| | Example 10 | Comparative Example A | Example 11 | Comparative Example 7 | Example 12 | Comparative Example 8 | Example 13 | Comparative Example 9 |
|---|---|---|---|---|---|---|---|---|
| TPU-1 | | | | | | | | |
| TPU-2 | | | | | | | | |
| TPU-3 | | | | | | | | |
| TPU-4 | 100 | | | | | | | |
| TPU-5 | | | | | | | | |
| TPEE | | | 100 | 100 | | | | |
| TPAE | | | | | 100 | 100 | | |
| POM | | | | | | | 100 | 100 |
| MAH-EPDM (phr) | 150 | 100 | | | 10 | | 10 | |
| MAH-EPM (phr) | | | 10 | | | | | |
| EPDM (phr) | | | | | | | | |
| Taber Abrasion Amount mg) | — | 128 | 35 | 67 | 30.5 | 39.5 | 48 | 62 |
| Bending Number Of Times (times) | 110,000 | 52,000 | — | — | — | — | — | — |
| JIS A Hardness | — | — | — | — | 94 | 93 | 95 | 95 |
| JIS D Hardness | — | — | 47 | 47 | — | — | — | — |
| Breaking Strength (MPa) | — | — | — | — | — | — | — | — |
| Breaking Elongation (%) | — | — | — | — | — | — | — | — |

TABLE 2-continued

|  | Example 10 | Comparative Example A | Example 11 | Comparative Example 7 | Example 12 | Comparative Example 8 | Example 13 | Comparative Example 9 |
|---|---|---|---|---|---|---|---|---|
| Aspect Ratio | — | — | — | — | — | — | — | — |
| Average Dispersed Particle Diameter | — | — | — | — | — | — | — | — |

Figure 5:
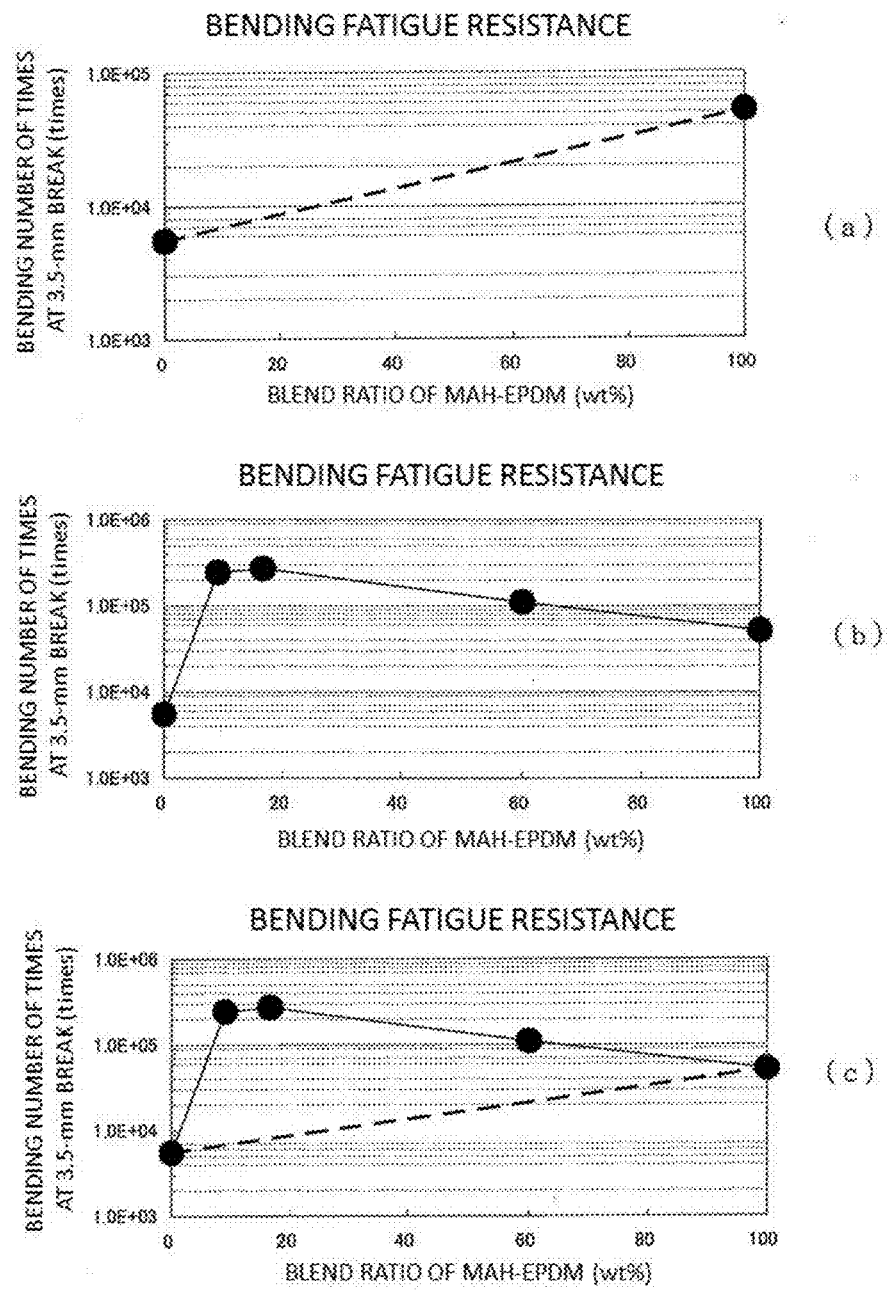
FIG. 5 is a graph indicating a relationship between the blend ratio of a modified ethylene copolymer in a thermoplastic resin composition and the bending fatigue resistance.

By using the each evaluation result (bending number of times) of Comparative Example 5 (MAH-EPDM: 0 wt %), Example 7 (MAH-EPDM: 9 wt %), Example 8 (MAH-EPDM: 17 wt %), Example 10 (MAH-EPDM: 60 wt %), and Comparative Example A (MAH-EPDM: 100 wt %) obtained in the above, a relationship between the blend ratio (wt %) of a modified ethylene copolymer (MAH-EPDM) in a thermoplastic resin composition (a thermoplastic elastomer alloy) and the bending fatigue resistance is expressed as a graph (single logarithmic graph) (see FIG. 5). In FIG. 5, the abscissa is the blend ratio (wt %) of MAH-EPDM, and the ordinate is the bending number of times. (a) of FIG. 5 is a graph obtained by plotting data of Comparative Example 5 and Comparative Example A and connecting these two points by a straight line (broken line). (b) of FIG. 5 is a graph obtained by plotting data of Comparative Example 5, Example 7, Example 8, Example 10 and Comparative Example A and connecting the each point by a straight line (solid line). (c) of FIG. 5 is a graph obtained by superposing (a) and (b) of FIG. 5.

As shown in FIG. 5, the bending fatigue resistances of the molded articles of the resin compositions in which the modified ethylene copolymer (B) is dispersed and contained in the thermoplastic resin (A) has more improved values than expected in each single material, and exhibits a synergistic effect.

Examples 14 to 20 and Comparative Examples 10 and 11

Examples Using Other Modified Ethylene Copolymers 100 parts by weight of the total of a polyethylene naphthalate resin (PEN) as a thermoplastic resin and X-EA as a modified ethylene copolymer (the ratio of both the components are shown in Table 3), variable amounts shown in Table 3 of a fatty acid metal salt (magnesium stearate), a phenol resin and a metal oxide (magnesium oxide) as curing agents, and one part by weight of an antiaging agent (2,2,4-trimethyl-1,2-dihydroquinoline polymer) were added to and kneaded in a Laboplasto Mill (made by Toyo Seki Seisaku-sho, Ltd., trade name "4C150"). First, the resins were sufficiently fused and kneaded, and thereafter the curing agents were added, and after the curing (crosslinking) reaction, the antiaging agent was added. The reaction was checked by changing behavior of the kneading torque value. The kneading temperature was set at 260° C., and the kneading was carried out for a total of 10 min. Thereafter, test pieces [100 mm×100 mm×2 mm thick (for abrasion test)] were fabricated by press molding. Respective evaluation test pieces such as tensile test pieces were stamped out from the abrasion test pieces. Bending fatigue test pieces were fabricated by injection molding. Comparative Example 10 was a PEN resin itself in which no additives except for an antiaging agent was added, and a sheet thereof was obtained by injection molding. Comparative Example 11 was prepared by kneading PEN resin and non-modified EPDM at a temperature near the melting point of the PEN by a Laboplasto Mill. Examples 19 and 20 were prepared by varying the blend proportion of PEN to X-EA and kneading by a twin-screw extruder in place of the Laboplasto Mill. The others were the same as Example 15. Properties of the obtained thermoplastic resin compositions and the average dispersed particle aspect ratios of the dispersed particles (X-EA particle and the like) were measured and evaluated by the above-mentioned methods. The results are shown in Table 3. The tensile elastic modulus, the modulus strength at 20% elongation, the tensile strength, the tensile elongation rate (tensile elongation) and the tension set were measured by a tensile test according to JIS K7311. The hardnesses (Shore A) in Table 3 are values measured according to JIS K6253 (durometer type A), and the hardnesses (Shore D) therein are values measured according to JIS K6253 (durometer type D).

TABLE 3

|  |  |  | Comp. Ex. 10 | Example 14 | Example 15 | Example 16 | Example 17 | Example 18 | Example 19 | Example 20 | Comp. Ex. 11 |
|---|---|---|---|---|---|---|---|---|---|---|---|
| Blend | PEN |  | 100 | 45 | 45 | 45 | 45 | 45 | 60 | 40 | 50 |
|  | X-EA |  | — | 55 | 55 | 55 | 55 | 55 | 40 | 60 | — |
|  | EPDM |  | — | — | — | — | — | — | — | — | 50 |
|  | Magnesium Stearate |  | — | 1.5 | 2 | 3 | 4 | 9 | 2 | 2 | 0 |
|  | Phenol Resin |  | — | 0.75 | 1 | 1.5 | 2 | 4.5 | 1 | 1 | 0 |
|  | Magnesium Oxide |  | — | 0.75 | 1 | 1.5 | 2 | 4.5 | 1 | 1 | 0 |
| Dispersion | Dispersoid |  | — | X-EA | X-EA | X-EA | X-EA | X-EA | X-EA | X-EA | EPDM |
|  | Average Dispersed Particle Diameter | μm | — | 0.25 | 0.25 | 0.25 | 0.15 | 0.15 | 0.1 | 0.25 | 4.1 |
|  | Aspect ratio |  | — | 3.2 | 2.5 | 2.5 | 1.9 | 1.6 | 1.7 | 3.5 | 1.9 |

TABLE 3-continued

| | | | Comp. Ex. 10 | Example 14 | Example 15 | Example 16 | Example 17 | Example 18 | Example 19 | Example 20 | Comp. Ex. 11 |
|---|---|---|---|---|---|---|---|---|---|---|---|
| Physical Properties | Tensile Elastic Modulus | MPa | 2200 | 237 | 267 | 210 | 201 | 266 | 450 | 230 | 228 |
| | Modulus Strength at 20% Elongation | MPa | — | 12.9 | 13.7 | 13.6 | 13.1 | 16.7 | 20.5 | 11.5 | 11.1 |
| | Tensile Strength | MPa | 74 | 23.6 | 26.8 | 29.1 | 29.3 | 35.5 | 45.5 | 42.3 | 20 |
| | Tensile Elongation Rate | % | <10 | 190 | 200 | 220 | 230 | 230 | 340 | 350 | 210 |
| | Hardness (Shore A) | | — | 72(A) | — | — | — | — | — | — | — |
| | Hardness (Shore D) | | 78(D) | 45(D) | 63(D) | 63(D) | 63(D) | 66(D) | 69(D) | 66(D) | 57(D) |
| | Tension set | % | 100 | 45 | 40.5 | 40.5 | 41.5 | 43 | 47 | 40 | 69 |
| | Taber Abrasion Test | mg | 51.9 | 40.3 | 40.6 | 35.6 | 36.8 | 39.3 | 37.8 | 36.5 | 54.1 |
| | Bending Fatigue Number Of Times | times | — | 103,000 | 252,000 | 140,000 | 300,000 | 444,000 | 803,000 | 180,000 | 4,250 |

Figure 6:
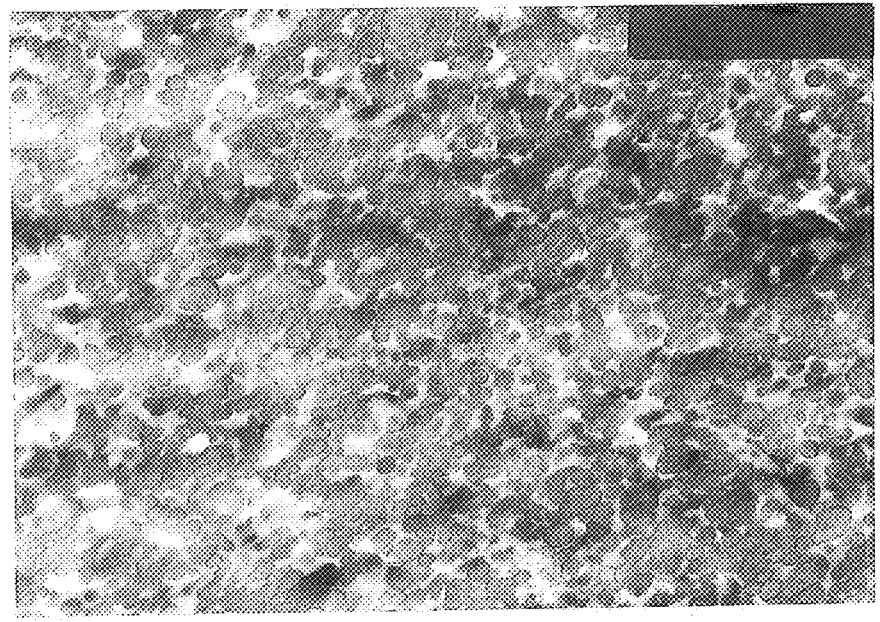
FIG. 6 is a TEM photograph of a sheet cross-section of a resin composition obtained in Example 14.
Figure 7:
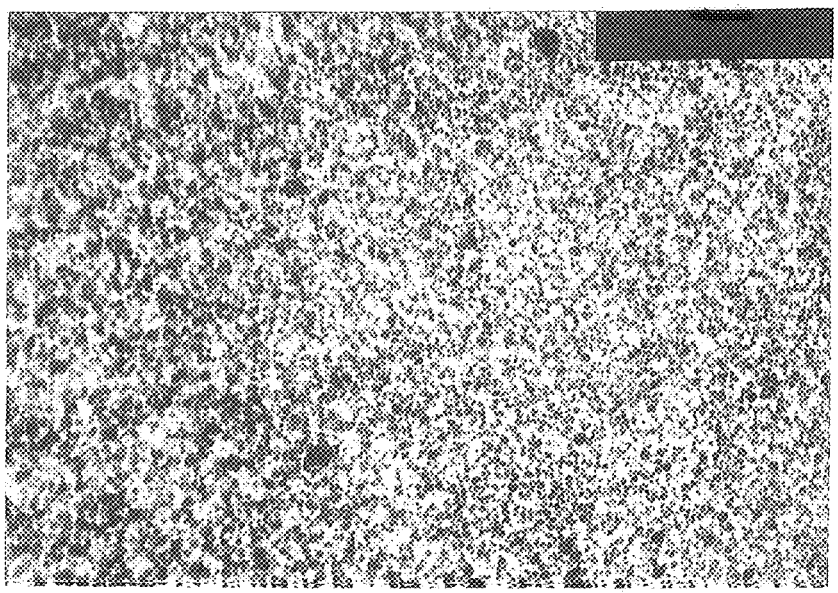
FIG. 7 is a TEM photograph of a sheet cross-section of a resin composition obtained in Example 19.
Figure 8:
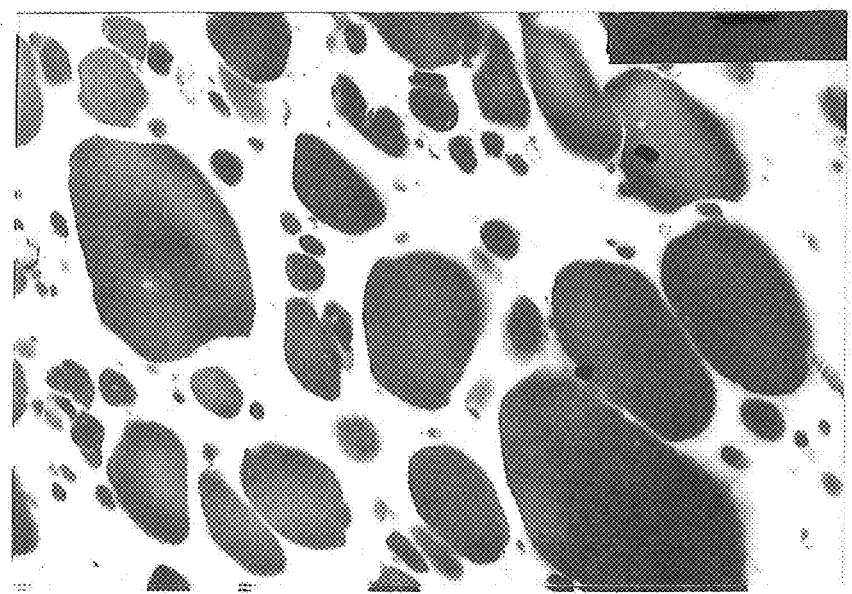
FIG. 8 is a TEM photograph of a sheet cross-section of a resin composition obtained in Comparative Example 11.

A TEM photograph of a sheet cross-section of the resin composition obtained in Example 14 is shown in FIG. 6 [a photograph of a magnification of 10,000 times (in a size of 112 mm×161 mm)]. A TEM photograph of a sheet cross-section of the resin composition obtained in Example 19 is shown in FIG. 7 [a photograph of a magnification of 10,000 times (in a size of 112 mm×161 mm)]. A TEM photograph of a sheet cross-section of the resin composition obtained in Comparative Example 11 is shown in FIG. 8 [a photograph of a magnification of 10,000 times (in a size of 112 mm×161 mm)]. It is found that the resin compositions obtained in Examples 14 and 19 have a very fine disperse state as compared with Comparative Example 11.

Example 21

A flat belt was manufactured using the pellet obtained in Example 1 [thermoplastic resin composition (thermoplastic elastomer alloy)] (see FIG. 11). That is, the thermoplastic resin composition (thermoplastic elastomer alloy) is continuously melt extruded in a sheet form from a front end die (T-die) by an extruder 4; while the melt resin (thermoplastic resin composition) 20 is poured, at the vicinity of the die, into a cavity formed between the surface of a mold roll 5 for molding a flat belt 1 as an object and a steel band 9; and core wires 3 (aramid cords, glass cords, steel cords or the like) are drawn in to thereby mold the belt. A press roll 6, a roll 7 and a roll 8 are disposed in the vicinity of the molding mold roll 5; the steel band 9 is stretched between each roll 6 to 8, and is made to turn together in cooperation with the molding mold roll 5. The core wires 3 are embedded in the melt resin by a pressure of the molding mold roll 5 and the steel band 9 to thereby mold a long-sized flat belt 1.

The obtained long-sized flat belt was cut into a necessary length by a certain-width finger (W)-shaped blade; both ends of the cut belt were abutted, and set in a mold having a convexo-concave shape conforming to a belt tooth profile on the surface; and the abutted portion was fused by hot press to form a joint to thereby obtain an endless belt (belt width: 25 mm, belt length: 1,200 mm, belt thickness: 2.5 mm). In the obtained flat belt, the count of the steel cords per 1-inch width is 15.

Comparative Example 12

An endless flat belt was manufactured by the same operation as in Example 21, except for using the pellet (thermoplastic elastomer) obtained in Comparative Example 1.

Evaluation Test B
<Belt Life Test>

The endless flat belts obtained in Example 21 and Comparative Example 12 were subjected to a belt life test using an overload running tester. The conditions of the running test are as follows. The test was finished at the time point when the belt lost the rotary transmission capability.

Layout: simple two-shafts
Belt size: 30 W×1,000 L
Pulley: φ90
Rotation frequency: 1,500 rpm
Initial tension: 400 N/30 W As a result, the flat belt of Comparative Example 12 generated damage such as cracks at a bending number of times of $9.0 \times 10^6$; by contrast, damage such as cracks was not observed on the flat belt of Comparative Example 21 even when the bending number of times reached $1.2 \times 10^8$.

From the above results, it is conceivable that the life of the flat belt has a correlation with the abrasion loss in the Taber abrasion test of a thermoplastic resin composition (thermoplastic elastomer (alloy)) and the bending number of times in the Demattia flex test thereof (Table 1).

INDUSTRIAL APPLICABILITY

The belt according to the present invention is excellent not only in abrasion resistance but also in bending fatigue resistance, and hardly causes abrasion, damage, cracks, breakage and the like on the belt body in an early stage and is remarkably excellent in durability, even if the belt is used at a high load for a long time. Therefore, the belt can suitably be utilized as belts for power transmission, conveyance and the like.

REFERENCE SIGNS LIST

1 BELT
2 BELT BODY
3 CORE WIRE
4 EXTRUDER
5 MOLDING MOLD ROLL
6 PRESS ROLL
7 ROLL
8 ROLL
9 STEEL BAND
20 MELT RESIN (THERMOPLASTIC ELASTOMER ALLOY OR THE LIKE)

The invention claimed is:

1. A belt, excluding toothed belts, wherein the whole or a part of a belt body is formed from a thermoplastic resin composition (C) comprising a thermoplastic resin (A) and a modified ethylene copolymer (B), and obtained by dispersing the modified ethylene copolymer (B) into the thermoplastic resin (A), wherein the thermoplastic resin (A) is at least one selected from the group consisting of polyacetal resins and polyamide-based thermoplastic elastomers, wherein a weight proportion [(B)/(A)] of the modified ethylene copolymer (B) to the thermoplastic resin (A) is in the range of 0.1/99.9 to 30/70, and the thermoplastic resin (A) and the modified ethylene copolymer (B) form a continuous phase and a disperse phase, respectively, in the thermoplastic resin composition (C), wherein the modified ethylene copolymer (B) in the thermoplastic resin composition (C) has an average dispersed particle aspect ratio of 1 to 3.5 and an average dispersed particle diameter of not more than 3 µm.

2. The belt according to claim 1, wherein the modified ethylene copolymer (B) is a copolymer modified with an unsaturated carboxylic acid or a derivative thereof, the copolymer being a copolymer of ethylene with at least one monomer component selected from the group consisting of (i) olefin components except for ethylene, (ii) diene components and (iii) ester components having an ethylenically unsaturated group.

3. The belt according to claim 1, wherein the modified ethylene copolymer (B) is an ethylene-propylene-diene copolymerized rubber modified with an unsaturated carboxylic acid or a derivative thereof.

4. The belt according to claim 1, wherein the thermoplastic resin composition (C) has a hardness (JIS K6253, durometer type A) of not less than 60.

5. The belt according to claim 2, wherein the thermoplastic resin composition (C) has a hardness (JIS K6253, durometer type A) of not less than 60.

* * * * *